United States Patent
Glynn et al.

(10) Patent No.: US 10,179,703 B2
(45) Date of Patent: Jan. 15, 2019

(54) SYSTEM AND METHOD FOR DELIVERING PROPPANT TO A BLENDER

(71) Applicant: Oren Technologies, LLC, Houston, TX (US)

(72) Inventors: Peter Glynn, Houston, TX (US); Joshua Oren, Houston, TX (US)

(73) Assignee: OREN TECHNOLOGIES, LLC, Houston, TX (US)

( * ) Notice: Subject to any disclaimer, the term of this patent is extended or adjusted under 35 U.S.C. 154(b) by 0 days.

(21) Appl. No.: 15/895,175

(22) Filed: Feb. 13, 2018

(65) Prior Publication Data

US 2018/0170682 A1   Jun. 21, 2018

Related U.S. Application Data

(63) Continuation of application No. 15/587,926, filed on May 5, 2017, which is a continuation of application
(Continued)

(51) Int. Cl.

| | |
|---|---|
| *B60P 1/00* | (2006.01) |
| *E21B 1/00* | (2006.01) |
| *B65G 47/19* | (2006.01) |
| *B65G 65/42* | (2006.01) |
| *B65G 41/00* | (2006.01) |

(Continued)

(52) U.S. Cl.
CPC .......... *B65G 41/002* (2013.01); *B65G 11/126* (2013.01); *B65G 15/22* (2013.01); *B65G 15/24* (2013.01); *B65G 43/08* (2013.01); *B65G 47/16* (2013.01); *B65G 47/19* (2013.01);
(Continued)

(58) Field of Classification Search
CPC ........ B65G 15/24; B65G 47/16; B65G 47/44; B65G 43/08; B65G 15/22; E21B 21/02
USPC .......... 414/222.01, 287, 334, 406, 522, 813; 198/538, 539, 540, 543, 544; 222/185.1, 222/371
See application file for complete search history.

(56) References Cited

U.S. PATENT DOCUMENTS

| 137,871 A | 4/1873 | Worsley |
|---|---|---|
| 150,894 A | 5/1874 | Safely |

(Continued)

FOREIGN PATENT DOCUMENTS

| CA | 2023138 | 8/1990 |
|---|---|---|
| CA | 2791088 | 9/2011 |

(Continued)

OTHER PUBLICATIONS

Final Office Action dated Jan. 22, 2018 for co-pending U.S. Appl. No. 13/628,702.
(Continued)

*Primary Examiner* — Douglas A Hess
(74) *Attorney, Agent, or Firm* — Hogan Lovells US LLP

(57) ABSTRACT

A system for conveying proppant includes a conveyor assembly having a conveyor belt that receives proppant from one or more containers having proppant stored therein. The system also includes a conveyor auxiliary unit connected to an end of the conveyor assembly having one or more joints to enable expansion and collapse of the conveyor belt from the conveyor assembly. The system further includes a proppant chute to direct the proppant from the conveyor belt into a blending hopper, the proppant chute being positioned at a higher elevation than an inlet of the blending hopper.

10 Claims, 9 Drawing Sheets

Related U.S. Application Data

No. 15/260,371, filed on Sep. 9, 2016, now Pat. No. 9,676,554, which is a continuation-in-part of application No. 14/854,622, filed on Sep. 15, 2015, now Pat. No. 9,670,752.

(60) Provisional application No. 62/217,117, filed on Sep. 11, 2015, provisional application No. 62/050,752, filed on Sep. 15, 2014.

(51) Int. Cl.
    *B65G 15/24*     (2006.01)
    *B65G 47/16*     (2006.01)
    *B65G 47/44*     (2006.01)
    *B65G 43/08*     (2006.01)
    *B65G 15/22*     (2006.01)
    *E21B 21/02*     (2006.01)
    *B65G 11/12*     (2006.01)

(52) U.S. Cl.
    CPC ............. *B65G 47/44* (2013.01); *B65G 65/42* (2013.01); *E21B 21/02* (2013.01)

(56) References Cited

U.S. PATENT DOCUMENTS

| | | |
|---|---|---|
| 384,443 A | 6/1888 | Hoover |
| 448,238 A | 3/1891 | Johnson |
| 710,611 A | 10/1902 | Ray |
| 711,632 A | 10/1902 | Johnson |
| 917,649 A | 4/1909 | Otto |
| 1,143,641 A | 6/1915 | McGregor |
| 1,331,883 A | 2/1920 | Stuart |
| 1,344,768 A | 6/1920 | Messiter |
| 1,434,488 A | 11/1922 | Forsythe et al. |
| 1,520,560 A | 12/1923 | Burno |
| 1,506,936 A | 9/1924 | Lea |
| 1,526,527 A | 2/1925 | Butler |
| 1,573,664 A | 2/1926 | Wetherill |
| 1,807,447 A | 5/1931 | Smith |
| 1,850,000 A | 3/1932 | Fernand |
| 1,932,320 A | 10/1933 | Steward |
| 1,973,312 A | 9/1934 | Hardinge |
| 2,020,628 A | 11/1935 | Woodruff |
| 2,233,005 A | 2/1941 | Garlinghouse |
| 2,255,448 A | 9/1941 | Morris |
| 2,293,160 A | 8/1942 | Miller et al. |
| 2,368,672 A | 2/1945 | McNamara |
| 2,381,103 A | 8/1945 | Frank |
| 2,385,245 A | 9/1945 | Willoughby |
| 2,413,661 A | 12/1946 | Stokes |
| 2,423,879 A | 7/1947 | De Frees |
| 2,563,470 A | 8/1951 | Kane |
| 2,564,020 A | 8/1951 | Mengel |
| 2,603,342 A | 7/1952 | Martinson |
| 2,616,758 A | 11/1952 | Meyers |
| 2,622,771 A | 12/1952 | Tulou |
| 2,652,174 A | 9/1953 | Shea et al. |
| 2,670,866 A | 3/1954 | Glesby |
| 2,678,145 A | 5/1954 | Ejuzwiak et al. |
| 2,693,282 A | 11/1954 | Sensibar |
| 2,700,574 A | 1/1955 | Tourneau |
| 2,792,262 A | 4/1955 | Hathorn |
| 2,774,515 A | 12/1956 | Johansson et al. |
| 2,791,973 A | 5/1957 | Dorey |
| 2,801,125 A | 7/1957 | Page et al. |
| 2,808,164 A | 10/1957 | Glendinning |
| 2,812,970 A | 11/1957 | Martinson |
| 2,837,369 A | 6/1958 | Stopps |
| 2,865,521 A | 12/1958 | Fisher et al. |
| 2,873,036 A | 2/1959 | Noble |
| 2,894,666 A | 7/1959 | Campbell, Jr. |
| 2,988,235 A | 6/1961 | Ronyak |
| 2,994,460 A | 8/1961 | Matthews |
| 3,041,113 A | 6/1962 | Sackett |
| 3,049,248 A | 8/1962 | Heltzel et al. |
| 3,064,832 A | 11/1962 | Heltzel |
| 3,083,879 A | 4/1963 | Coleman |
| 3,090,527 A | 5/1963 | Rensch |
| 3,109,389 A | 11/1963 | Karlsson |
| 3,122,258 A | 2/1964 | Raymond |
| 3,134,606 A | 5/1964 | Oyler |
| 3,135,432 A | 6/1964 | McKinney |
| 3,163,127 A | 12/1964 | Gutridge et al. |
| 3,187,684 A | 6/1965 | Ortner |
| 3,198,494 A | 8/1965 | Curran et al. |
| 3,199,585 A | 8/1965 | Cronberger |
| 3,248,026 A | 4/1966 | Kemp |
| 3,255,927 A | 6/1966 | Ruppert et al. |
| 3,265,443 A | 8/1966 | Simas |
| 3,270,921 A | 9/1966 | Nadolske et al. |
| 3,281,006 A | 10/1966 | Tonchung |
| 3,294,306 A | 12/1966 | Areddy |
| 3,318,473 A | 5/1967 | Jones et al. |
| 3,326,572 A | 6/1967 | Murray |
| 3,343,688 A | 9/1967 | Ross |
| 3,353,599 A | 11/1967 | Swift |
| 3,354,918 A | 11/1967 | Coleman |
| 3,378,152 A | 4/1968 | Warner |
| 3,387,570 A | 6/1968 | Pulcrano et al. |
| 3,396,675 A | 8/1968 | Stevens |
| 3,397,654 A | 8/1968 | Snyder |
| 3,406,995 A | 10/1968 | McCarthy |
| 3,407,971 A | 10/1968 | Oehler |
| 3,425,599 A | 2/1969 | Sammarco et al. |
| 3,455,474 A | 7/1969 | Truncali |
| 3,476,270 A | 11/1969 | Cox et al. |
| 3,486,787 A | 12/1969 | Campbell |
| 3,499,694 A | 3/1970 | Coppel |
| 3,508,762 A | 4/1970 | Pratt |
| 3,524,567 A | 8/1970 | Coleman |
| 3,528,570 A | 9/1970 | Pase |
| 3,561,633 A | 2/1971 | Morrison et al. |
| 3,587,834 A | 6/1971 | Dugge |
| 3,596,609 A | 8/1971 | Ortner |
| 3,601,244 A | 8/1971 | Ort et al. |
| 3,602,400 A | 8/1971 | Cooke |
| 3,650,567 A | 3/1972 | Danielson |
| 3,653,521 A | 4/1972 | Bridge |
| 3,661,293 A | 5/1972 | Gerhard et al. |
| 3,692,363 A | 9/1972 | Tenebaum et al. |
| 3,704,797 A | 12/1972 | Suykens |
| 3,721,199 A | 3/1973 | Hassenauer |
| 3,729,121 A | 4/1973 | Cannon |
| 3,734,215 A | 5/1973 | Smith |
| 3,738,511 A | 6/1973 | Lemon et al. |
| 3,752,511 A | 8/1973 | Racy |
| 3,777,909 A | 12/1973 | Rheinfrank |
| 3,785,534 A | 1/1974 | Smith |
| 3,800,712 A | 4/1974 | Krug, Jr. |
| 3,802,584 A | 4/1974 | Sackett |
| 3,817,261 A | 6/1974 | Rogge |
| 3,820,762 A | 6/1974 | Bostrom et al. |
| 3,827,578 A | 8/1974 | Hough |
| 3,840,141 A | 10/1974 | Allom et al. |
| 3,854,612 A | 12/1974 | Snape |
| 3,861,716 A | 1/1975 | Baxter et al. |
| 3,883,005 A | 5/1975 | Stevens |
| 3,904,105 A | 9/1975 | Booth |
| 3,909,223 A | 9/1975 | Schmidt |
| 3,913,933 A | 10/1975 | Visser et al. |
| 3,933,100 A | 1/1976 | Dugge |
| 3,963,149 A | 6/1976 | Fassauer |
| 3,970,123 A | 7/1976 | Poulton et al. |
| 3,986,708 A | 10/1976 | Heltzel et al. |
| 3,997,089 A | 12/1976 | Clarke et al. |
| 3,999,290 A | 12/1976 | Wood |
| 4,003,301 A | 1/1977 | Norton |
| 4,004,700 A | 1/1977 | Empey |
| 4,019,635 A | 4/1977 | Boots |
| 4,057,153 A | 11/1977 | Weaver |
| 4,058,239 A | 11/1977 | Van Mill |
| 4,063,656 A | 12/1977 | Lambert |

(56) References Cited

U.S. PATENT DOCUMENTS

| | | |
|---|---|---|
| 4,073,410 A | 2/1978 | Melcher |
| 4,125,195 A | 11/1978 | Sasadi |
| 4,138,163 A | 2/1979 | Calvert et al. |
| 4,178,117 A | 12/1979 | Brugler |
| 4,204,773 A | 5/1980 | Bates |
| 4,210,273 A | 7/1980 | Hegele |
| 4,210,963 A | 7/1980 | Ricciardi et al. |
| RE30,358 E | 8/1980 | Sensibar |
| 4,222,498 A | 9/1980 | Brock |
| 4,227,732 A | 10/1980 | Kish |
| 4,232,884 A | 11/1980 | DeWitt |
| 4,239,424 A | 12/1980 | Pavolka |
| 4,245,820 A | 1/1981 | Muryn |
| 4,247,228 A | 1/1981 | Gray et al. |
| 4,247,370 A | 1/1981 | Nijhawan et al. |
| 4,258,953 A | 3/1981 | Johnson |
| 4,265,266 A | 5/1981 | Kierbow et al. |
| 4,278,190 A | 7/1981 | Oory et al. |
| 4,280,640 A | 7/1981 | Daloisio |
| 4,282,988 A | 8/1981 | Hulbert, Jr. |
| 4,287,921 A | 9/1981 | Sanford |
| 4,287,997 A | 9/1981 | Rolfe et al. |
| 4,289,353 A | 9/1981 | Merritt |
| 4,299,597 A | 11/1981 | Oetiker et al. |
| 4,306,895 A | 12/1981 | Thompson et al. |
| 4,329,106 A | 5/1982 | Adler |
| 4,350,241 A | 9/1982 | Wenzel |
| 4,359,176 A | 11/1982 | Johnson |
| 4,363,396 A | 12/1982 | Wolf et al. |
| 4,395,052 A | 7/1983 | Rash |
| 4,397,406 A | 8/1983 | Croley |
| 4,398,653 A | 8/1983 | Daloisio |
| 4,402,392 A | 9/1983 | Fabian et al. |
| 4,407,202 A | 10/1983 | McCormick |
| 4,408,886 A | 10/1983 | Sampson et al. |
| 4,410,106 A | 10/1983 | Kierbow et al. |
| 4,420,285 A | 12/1983 | Loyer et al. |
| 4,427,133 A | 1/1984 | Kierbow et al. |
| 4,428,504 A | 1/1984 | Bassett et al. |
| 4,449,861 A | 5/1984 | Saito et al. |
| 4,453,645 A | 6/1984 | Usui et al. |
| 4,474,204 A | 10/1984 | West |
| 4,475,672 A | 10/1984 | Whitehead |
| 4,478,155 A | 10/1984 | Cena et al. |
| 4,483,462 A | 11/1984 | Heintz |
| 4,513,755 A | 4/1985 | Baroni |
| 4,525,071 A | 6/1985 | Horowitz |
| 4,526,353 A | 7/1985 | Stomp |
| 4,532,098 A | 7/1985 | Campbell |
| 4,534,869 A | 8/1985 | Seibert |
| 4,552,573 A | 11/1985 | Weis |
| 4,569,394 A | 2/1986 | Sweatman et al. |
| 4,570,967 A | 2/1986 | Allnut |
| 4,571,143 A | 2/1986 | Hellerich |
| 4,588,605 A | 5/1986 | Frei et al. |
| 4,608,931 A | 9/1986 | Ruhmann et al. |
| 4,619,531 A | 10/1986 | Dunstan |
| 4,624,729 A | 11/1986 | Bresciani et al. |
| 4,626,155 A | 12/1986 | Hlinsky et al. |
| 4,626,166 A | 12/1986 | Jolly |
| 4,628,825 A | 12/1986 | Taylor et al. |
| 4,639,015 A | 1/1987 | Pitts |
| 4,648,584 A | 3/1987 | Wamser |
| 4,660,733 A | 4/1987 | Snyder et al. |
| 4,701,095 A | 10/1987 | Berryman et al. |
| 4,714,010 A | 12/1987 | Smart |
| 4,715,754 A | 12/1987 | Scully |
| 4,724,976 A | 2/1988 | Lee |
| 4,738,774 A | 4/1988 | Patrick |
| 4,741,273 A | 5/1988 | Sherwood |
| 4,761,039 A | 8/1988 | Hilaris |
| 4,779,751 A | 10/1988 | Munroe |
| 4,798,039 A | 1/1989 | Deglise |
| 4,801,389 A | 1/1989 | Brannon et al. |
| 4,819,830 A | 4/1989 | Schultz |
| 4,836,510 A | 6/1989 | Weber et al. |
| 4,836,735 A | 6/1989 | Dennehy |
| 4,848,605 A | 7/1989 | Wise |
| 4,882,784 A | 11/1989 | Tump |
| 4,889,219 A | 12/1989 | Key |
| 4,901,649 A | 2/1990 | Fehrenbach et al. |
| 4,909,378 A | 3/1990 | Webb |
| 4,909,556 A | 3/1990 | Koskinen |
| 4,917,019 A | 4/1990 | Hesch et al. |
| 4,919,583 A | 4/1990 | Speakman, Jr. |
| 4,923,358 A | 5/1990 | Van Mill |
| 4,946,068 A | 8/1990 | Erickson et al. |
| 4,947,760 A | 8/1990 | Dawson et al. |
| 4,949,714 A | 8/1990 | Orr |
| 4,954,975 A | 9/1990 | Kalata |
| 4,956,821 A | 9/1990 | Fenelon |
| 4,964,243 A | 10/1990 | Reiter |
| 4,975,205 A | 12/1990 | Sloan |
| 4,975,305 A | 12/1990 | Biginelli |
| 4,988,115 A | 1/1991 | Steinke |
| 4,995,522 A | 2/1991 | Barr |
| 5,004,400 A | 4/1991 | Handke |
| 5,028,002 A | 7/1991 | Whitford |
| 5,036,979 A | 8/1991 | Selz |
| 5,042,538 A | 8/1991 | Wiese |
| 5,069,352 A | 12/1991 | Harbolt et al. |
| 5,080,259 A | 1/1992 | Hadley |
| 5,082,304 A | 1/1992 | Preller |
| 5,102,281 A | 4/1992 | Handke |
| 5,102,286 A | 4/1992 | Fenton |
| 5,105,858 A | 4/1992 | Levinson |
| 5,131,524 A | 7/1992 | Uehara |
| 5,167,719 A | 12/1992 | Tamaki |
| 5,190,182 A | 3/1993 | Copas et al. |
| 5,195,861 A | 3/1993 | Handke |
| 5,199,826 A | 4/1993 | Lawrence |
| 5,201,546 A | 4/1993 | Lindsay |
| 5,224,635 A | 7/1993 | Wise |
| 5,253,746 A | 10/1993 | Friesen et al. |
| 5,253,776 A | 10/1993 | Decroix et al. |
| 5,265,763 A | 11/1993 | Heinrici et al. |
| 5,277,014 A | 1/1994 | White |
| 5,280,883 A | 1/1994 | Ibar |
| 5,286,158 A | 2/1994 | Zimmerman |
| 5,286,294 A | 2/1994 | Ebi et al. |
| 5,290,139 A | 3/1994 | Hedrick |
| 5,317,783 A | 6/1994 | Williamson |
| 5,320,046 A | 6/1994 | Hesch |
| 5,324,097 A | 6/1994 | DeCap |
| 5,339,996 A | 8/1994 | Dubbert |
| 5,345,982 A | 9/1994 | Nadeau et al. |
| 5,358,137 A | 10/1994 | Shuert et al. |
| 5,373,792 A | 12/1994 | Pileggi et al. |
| 5,392,946 A | 2/1995 | Holbrook et al. |
| 5,402,915 A | 4/1995 | Hogan |
| 5,413,154 A | 5/1995 | Hurst, Jr. et al. |
| 5,429,259 A | 7/1995 | Robin |
| 5,441,321 A | 8/1995 | Karpisek |
| 5,465,829 A | 11/1995 | Kruse |
| 5,470,175 A | 11/1995 | Jensen et al. |
| 5,470,176 A | 11/1995 | Corcoran et al. |
| 5,493,852 A | 2/1996 | Stewart |
| 5,498,119 A | 3/1996 | Faivre |
| 5,507,514 A | 4/1996 | Jacques |
| 5,538,286 A | 7/1996 | Hoff |
| 5,549,278 A | 8/1996 | Sidler |
| 5,564,599 A | 10/1996 | Barber et al. |
| 5,570,743 A | 11/1996 | Padgett et al. |
| 5,590,976 A | 1/1997 | Kilheffer et al. |
| 5,601,181 A | 2/1997 | Lindhorst |
| 5,602,761 A | 2/1997 | Spoerre et al. |
| 5,613,446 A | 3/1997 | DiLuigi et al. |
| 5,617,974 A | 4/1997 | Sawyer |
| 5,647,514 A | 7/1997 | Toth et al. |
| RE35,580 E | 8/1997 | Heider et al. |
| 5,667,298 A | 9/1997 | Musil |
| 5,687,881 A | 11/1997 | Rouse et al. |
| 5,690,466 A | 11/1997 | Gaddis et al. |
| 5,697,535 A | 12/1997 | Coleman |

(56) References Cited

U.S. PATENT DOCUMENTS

| | | |
|---|---|---|
| 5,706,614 A | 1/1998 | Wiley et al. |
| 5,718,555 A | 2/1998 | Swalheim |
| 5,722,552 A | 3/1998 | Olson |
| 5,722,688 A | 3/1998 | Garcia |
| 5,746,258 A | 5/1998 | Huck |
| 5,761,854 A | 6/1998 | Johnson et al. |
| 5,762,222 A | 6/1998 | Liu |
| 5,772,390 A | 6/1998 | Walker |
| 5,782,524 A | 7/1998 | Heider et al. |
| 5,785,421 A | 7/1998 | Milek |
| 5,803,296 A | 9/1998 | Olson |
| 5,806,863 A | 9/1998 | Heger et al. |
| 5,836,480 A | 11/1998 | Epp et al. |
| 5,845,799 A | 12/1998 | Deaton |
| 5,876,172 A | 3/1999 | Di Rosa |
| 5,878,903 A | 3/1999 | Ung |
| 5,906,471 A | 5/1999 | Schwoerer |
| 5,911,337 A | 6/1999 | Bedeker |
| 5,924,829 A | 7/1999 | Hastings |
| 5,927,558 A | 7/1999 | Bruce |
| 5,960,974 A | 10/1999 | Kee |
| 5,971,219 A | 10/1999 | Karpisek |
| 5,993,202 A | 11/1999 | Yamazaki et al. |
| 5,997,099 A | 12/1999 | Collins |
| 6,002,063 A | 12/1999 | Bilak et al. |
| 6,006,918 A | 12/1999 | Hart |
| 6,069,118 A | 5/2000 | Hinkel et al. |
| 6,077,068 A | 6/2000 | Okumura |
| 6,092,974 A | 7/2000 | Roth |
| 6,109,486 A | 8/2000 | Lee |
| 6,120,233 A | 9/2000 | Adam |
| D431,358 S | 10/2000 | Willemsen |
| 6,155,175 A | 12/2000 | Rude et al. |
| 6,186,654 B1 | 2/2001 | Gunteret et al. |
| 6,190,107 B1 | 2/2001 | Lanigan et al. |
| 6,192,985 B1 | 2/2001 | Hinkel et al. |
| 6,196,590 B1 | 3/2001 | Kim |
| 6,205,938 B1 | 3/2001 | Foley et al. |
| 6,210,088 B1 | 4/2001 | Crosby |
| 6,231,284 B1 | 5/2001 | Kordel |
| 6,247,594 B1 | 6/2001 | Garton |
| 6,263,803 B1 | 7/2001 | Dohr et al. |
| 6,269,849 B1 | 8/2001 | Fields |
| 6,273,154 B1 | 8/2001 | Laug |
| 6,283,212 B1 | 9/2001 | Hinkel et al. |
| 6,286,986 B2 | 9/2001 | Grimland |
| 6,296,109 B1 | 10/2001 | Nohl |
| 6,306,800 B1 | 10/2001 | Samuel et al. |
| 6,328,156 B1 | 12/2001 | Otsman |
| 6,328,183 B1 | 12/2001 | Coleman |
| 6,364,584 B1 | 4/2002 | Taylor |
| 6,374,915 B1 | 4/2002 | Andrews |
| 6,382,446 B1 | 5/2002 | Hinkle et al. |
| 6,390,742 B1 | 5/2002 | Breeden |
| 6,401,983 B1 | 6/2002 | McDonald et al. |
| 6,412,422 B2 | 7/2002 | Dohr et al. |
| 6,415,909 B1 | 7/2002 | Mitchell et al. |
| 6,416,271 B1 | 7/2002 | Pigott et al. |
| 6,422,413 B1 | 7/2002 | Hall et al. |
| 6,425,725 B1 | 7/2002 | Ehlers |
| 6,450,522 B1 | 9/2002 | Yamada et al. |
| 6,457,291 B2 | 10/2002 | Wick |
| 6,498,976 B1 | 12/2002 | Ehlbeck et al. |
| 6,505,760 B1 | 1/2003 | Werner |
| 6,508,387 B1 | 1/2003 | Simon et al. |
| 6,508,615 B2 | 1/2003 | Taylor |
| 6,523,482 B2 | 2/2003 | Wingate |
| 6,537,002 B2 | 3/2003 | Gloystein |
| 6,557,896 B1 | 5/2003 | Stobart |
| 6,575,614 B2 | 6/2003 | Tosco et al. |
| 6,660,693 B2 | 12/2003 | Miller et al. |
| 6,663,373 B2 | 12/2003 | Yoshida |
| 6,666,573 B2 | 12/2003 | Grassi |
| 6,675,066 B2 | 1/2004 | Moshgbar |
| 6,675,073 B2 | 1/2004 | Kieman et al. |
| 6,705,449 B2 | 3/2004 | Wagstaffe |
| 6,720,290 B2 | 4/2004 | England et al. |
| 6,772,912 B1 | 8/2004 | Schall et al. |
| 6,774,318 B2 | 8/2004 | Beal et al. |
| 6,776,235 B1 | 8/2004 | England |
| 6,783,032 B2 | 8/2004 | Fons |
| 6,811,048 B2 | 11/2004 | Lau |
| 6,828,280 B2 | 12/2004 | England et al. |
| 6,835,041 B1 | 12/2004 | Albert |
| 6,882,960 B2 | 4/2005 | Miller |
| 6,902,061 B1 | 6/2005 | Elstone |
| 6,915,854 B2 | 7/2005 | England et al. |
| 6,953,119 B1 | 10/2005 | Wening |
| 6,955,127 B2 | 10/2005 | Taylor |
| 6,964,551 B1 | 11/2005 | Friesen |
| 6,968,946 B2 | 11/2005 | Shuert |
| 6,974,021 B1 | 12/2005 | Boevers |
| 7,008,163 B2 | 3/2006 | Russell |
| 7,051,661 B2 | 5/2006 | Herzog et al. |
| 7,084,095 B2 | 8/2006 | Lee et al. |
| 7,104,425 B2 | 9/2006 | Le Roy |
| 7,140,516 B2 | 11/2006 | Bothor |
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Saik |
| 7,252,309 B2 | 8/2007 | Eng Soon et al. |
| 7,284,579 B2 | 10/2007 | Elgan et al. |
| 7,284,670 B2 | 10/2007 | Schmid |
| 7,316,333 B2 | 1/2008 | Wegner |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,695,538 B2 | 4/2010 | Cheng |
| 7,753,637 B2 | 7/2010 | Benedict et al. |
| 7,798,558 B2 | 9/2010 | Messier |
| 7,802,958 B2 | 9/2010 | Garcia et al. |
| 7,803,321 B2 | 9/2010 | Lark et al. |
| 7,837,427 B2 | 11/2010 | Beckel |
| 7,841,394 B2 | 11/2010 | McNeel et al. |
| 7,845,516 B2 | 12/2010 | Pessin et al. |
| 7,858,888 B2 | 12/2010 | Lucas et al. |
| 7,867,613 B2 | 1/2011 | Smith |
| 7,891,304 B2 | 2/2011 | Herzog et al. |
| 7,891,523 B2 | 2/2011 | Mehus et al. |
| 7,896,198 B2 | 3/2011 | Mehus et al. |
| 7,921,783 B2 | 4/2011 | Forbes et al. |
| 7,967,161 B2 | 6/2011 | Townsend |
| 7,980,803 B2 | 7/2011 | Brandstatter et al. |
| 7,997,213 B1 | 8/2011 | Gauthier et al. |
| 7,997,623 B2 | 8/2011 | Williams |
| 8,083,083 B2 | 12/2011 | Mohns |
| 8,201,520 B2 | 6/2012 | Meritt |
| 8,313,278 B2 | 11/2012 | Simmons et al. |
| 8,366,349 B2 | 2/2013 | Beachner |
| 8,375,690 B2 | 2/2013 | LaFargue et al. |
| 8,379,927 B2 | 2/2013 | Taylor |
| 8,387,824 B2 | 3/2013 | Wietgrefe |
| 8,393,502 B2 | 3/2013 | Renyer et al. |
| 8,424,666 B2 | 4/2013 | Berning et al. |
| 8,469,065 B2 | 6/2013 | Schroeder et al. |
| D688,351 S | 8/2013 | Oren |
| 8,505,780 B2 | 8/2013 | Oren |
| 8,544,419 B1 | 10/2013 | Spalding et al. |
| 8,545,148 B2 | 10/2013 | Wanek-Pusset et al. |
| 8,562,022 B2 | 10/2013 | Nadeau et al. |
| 8,573,387 B2 | 11/2013 | Trimble |
| 8,573,917 B2 | 11/2013 | Renyer |
| 8,585,341 B1 | 11/2013 | Oren |
| D694,670 S | 12/2013 | Oren |
| 8,616,370 B2 | 12/2013 | Allegretti |
| 8,622,251 B2 | 1/2014 | Oren |
| 8,636,832 B2 | 1/2014 | Stutzman et al. |
| 8,646,641 B2 | 2/2014 | Moir |

(56) References Cited

U.S. PATENT DOCUMENTS

| | | |
|---|---|---|
| 8,662,525 B1 | 3/2014 | Dierks et al. |
| 8,668,430 B2 | 3/2014 | Oren |
| D703,582 S | 4/2014 | Oren |
| 8,820,559 B2 | 9/2014 | Beitler et al. |
| 8,827,118 B2 | 9/2014 | Oren |
| 8,881,749 B1 | 11/2014 | Smith |
| 8,887,914 B2 | 11/2014 | Allegretti |
| 8,905,266 B2 | 12/2014 | De Brabanter |
| 8,915,691 B2 | 12/2014 | Mintz |
| 9,051,801 B1 | 6/2015 | Mintz |
| 9,052,034 B1 | 6/2015 | Wegner et al. |
| D740,556 S | 10/2015 | Huber |
| 9,162,261 B1 | 10/2015 | Smith |
| 9,267,266 B2 | 2/2016 | Cutler et al. |
| 9,296,572 B2 | 3/2016 | Houghton et al. |
| 9,309,064 B2 | 4/2016 | Sheesley |
| 9,410,414 B2 | 8/2016 | Tudor |
| D780,883 S | 3/2017 | Schaffner et al. |
| D783,771 S | 4/2017 | Stegemoeller et al. |
| D783,772 S | 4/2017 | Stegemoeller, III et al. |
| 9,624,036 B2 | 4/2017 | Luharuka et al. |
| 9,688,492 B2 | 6/2017 | Stutzman et al. |
| 9,796,318 B1 | 10/2017 | Nolasco |
| 2001/0022308 A1 | 9/2001 | Epp et al. |
| 2001/0038777 A1 | 11/2001 | Cassell |
| 2001/0045338 A1 | 11/2001 | Ransil et al. |
| 2002/0134550 A1 | 9/2002 | Leeson et al. |
| 2002/0139643 A1 | 10/2002 | Peltier et al. |
| 2003/0006248 A1 | 1/2003 | Gill et al. |
| 2003/0024971 A1 | 2/2003 | Jones |
| 2003/0111470 A1 | 6/2003 | Fouillet et al. |
| 2003/0145418 A1 | 8/2003 | Ikeda et al. |
| 2003/0156929 A1 | 8/2003 | Russell |
| 2004/0065699 A1 | 4/2004 | Schoer et al. |
| 2004/0074922 A1 | 4/2004 | Bother et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1 | 2/2006 | Beach |
| 2006/0053582 A1 | 3/2006 | Engel et al. |
| 2006/0091072 A1 | 5/2006 | Schmid et al. |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 | 5/2007 | Hicks |
| 2007/0125543 A1 | 6/2007 | McNeel et al. |
| 2007/0194564 A1 | 8/2007 | Garceau et al. |
| 2008/0008562 A1 | 1/2008 | Beckel et al. |
| 2008/0029546 A1 | 2/2008 | Schuld |
| 2008/0029553 A1 | 2/2008 | Culleton |
| 2008/0058228 A1 | 3/2008 | Wilson |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2008/0315558 A1 | 12/2008 | Cesterino |
| 2009/0038242 A1 | 2/2009 | Cope |
| 2009/0078410 A1 | 3/2009 | Krenek et al. |
| 2009/0223143 A1 | 9/2009 | Esposito |
| 2009/0278326 A1 | 11/2009 | Rowland et al. |
| 2010/0021258 A1 | 1/2010 | Kim |
| 2010/0037572 A1 | 2/2010 | Cheng |
| 2010/0038143 A1 | 2/2010 | Burnett et al. |
| 2010/0040446 A1 | 2/2010 | Renyer |
| 2010/0065466 A1 | 3/2010 | Perkins |
| 2010/0072308 A1 | 3/2010 | Hermann et al. |
| 2010/0080681 A1 | 4/2010 | Bain |
| 2010/0108711 A1 | 5/2010 | Wietgrefe |
| 2010/0129193 A1 | 5/2010 | Sherrer |
| 2010/0199668 A1 | 8/2010 | Coustou et al. |
| 2010/0207371 A1 | 8/2010 | Van Houdt et al. |
| 2010/0278621 A1 | 11/2010 | Redekop |
| 2010/0288603 A1 | 11/2010 | Schafer |
| 2010/0320727 A1 | 12/2010 | Haut et al. |
| 2011/0011893 A1 | 1/2011 | Cerny |
| 2011/0017693 A1 | 1/2011 | Thomas |
| 2011/0101040 A1 | 5/2011 | Weissbrod |
| 2011/0109073 A1 | 5/2011 | Williams |
| 2011/0121003 A1 | 5/2011 | Moir |
| 2011/0127178 A1 | 6/2011 | Claussen |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1 | 9/2011 | Dugic et al. |
| 2011/0297702 A1 | 12/2011 | Hildebrandt et al. |
| 2012/0017812 A1 | 1/2012 | Renyer |
| 2012/0090956 A1 | 4/2012 | Brobst |
| 2012/0103848 A1 | 5/2012 | Allegretti et al. |
| 2012/0219391 A1 | 8/2012 | Teichrob et al. |
| 2012/0247335 A1 | 10/2012 | Stutzman et al. |
| 2012/0255539 A1 | 10/2012 | Kolecki |
| 2013/0004272 A1 | 1/2013 | Mintz |
| 2013/0022441 A1 | 1/2013 | Uhryn et al. |
| 2013/0206415 A1 | 8/2013 | Sheesley |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0034662 A1 | 2/2014 | Chalmers et al. |
| 2014/0044507 A1 | 2/2014 | Naizer et al. |
| 2014/0077484 A1 | 3/2014 | Harrell |
| 2014/0083554 A1 | 3/2014 | Harris |
| 2014/0093319 A1 | 4/2014 | Harris et al. |
| 2014/0097182 A1 | 4/2014 | Sheesley |
| 2014/0166647 A1 | 6/2014 | Sheesley |
| 2014/0203046 A1 | 7/2014 | Allegretti |
| 2014/0234059 A1 | 8/2014 | Thomeer |
| 2014/0305769 A1 | 10/2014 | Eiden et al. |
| 2014/0321950 A1 | 10/2014 | Krenek et al. |
| 2014/0377042 A1 | 12/2014 | McMahon |
| 2015/0004895 A1 | 1/2015 | Hammers et al. |
| 2015/0069052 A1 | 3/2015 | Allegretti et al. |
| 2015/0079890 A1 | 3/2015 | Stutzman et al. |
| 2015/0086307 A1 | 3/2015 | Stefan |
| 2015/0086308 A1 | 3/2015 | McIver et al. |
| 2015/0107822 A1 | 4/2015 | Tudor |
| 2015/0110565 A1 | 4/2015 | Harris |
| 2015/0115589 A1 | 4/2015 | Thiessen |
| 2015/0159232 A1 | 6/2015 | Zucchi et al. |
| 2015/0209829 A1 | 7/2015 | De Siqueira et al. |
| 2015/0284183 A1 | 10/2015 | Houghton et al. |
| 2016/0148813 A1 | 5/2016 | Rogers et al. |
| 2016/0177678 A1 | 6/2016 | Morris et al. |
| 2016/0185522 A1 | 6/2016 | Herman et al. |
| 2016/0273355 A1 | 9/2016 | Gosney et al. |
| 2016/0280480 A1 | 9/2016 | Smith et al. |
| 2017/0129721 A1 | 5/2017 | Harris et al. |
| 2017/0217353 A1 | 8/2017 | Vander Pol |
| 2018/0009401 A1 | 1/2018 | Miller et al. |

FOREIGN PATENT DOCUMENTS

| | | |
|---|---|---|
| CN | 2037354 | 5/1989 |
| CN | 2059909 | 8/1990 |
| CN | 2075632 | 4/1991 |
| CN | 1329562 | 1/2002 |
| CN | 2517684 | 10/2002 |
| CN | 1635965 | 7/2005 |
| CN | 2913250 | 6/2007 |
| CN | 201161588 | 12/2008 |
| CN | 201390486 | 1/2010 |

(56) References Cited

FOREIGN PATENT DOCUMENTS

| | | |
|---|---|---|
| CN | 101823630 | 9/2010 |
| CN | 102101595 | 6/2011 |
| CN | 201881469 | 6/2011 |
| CN | 102114985 | 7/2011 |
| CN | 203033469 | 7/2013 |
| CN | 103350017 | 10/2013 |
| CN | 203580948 | 5/2014 |
| DE | 3108121 | 9/1982 |
| DE | 3342281 | 11/1983 |
| DE | 4008147 | 9/1990 |
| DE | 4217329 | 5/1993 |
| DE | 20317967 | 3/2004 |
| EP | 0016977 | 10/1980 |
| EP | 0019967 | 7/1984 |
| EP | 322283 | 6/1989 |
| EP | 0564969 | 10/1993 |
| EP | 0997607 | 5/2000 |
| EP | 1052194 | 11/2000 |
| EP | 1598288 | 11/2005 |
| EP | 1775190 | 6/2007 |
| EP | 1795467 | 6/2007 |
| EP | 1167236 | 6/2008 |
| EP | 2062832 | 4/2011 |
| EP | 2311757 | 4/2011 |
| FR | 2173445 | 10/1973 |
| FR | 2640598 | 12/1988 |
| GB | 1000621 | 8/1965 |
| GB | 1296736 | 11/1972 |
| GB | 2066220 | 7/1981 |
| GB | 2204847 | 11/1988 |
| GB | 2374864 | 10/2002 |
| JP | S4871029 | 9/1973 |
| JP | S4876041 | 9/1973 |
| JP | S58161888 | 10/1983 |
| JP | 10264882 | 3/1997 |
| JP | 410087046 | 4/1998 |
| JP | 11034729 | 2/1999 |
| JP | 2007084151 | 4/2007 |
| MX | 2012011046 | 5/2013 |
| NL | 8105283 | 6/1983 |
| WO | 1990008082 | 7/1990 |
| WO | 1992002437 | 2/1992 |
| WO | 1993001997 | 2/1993 |
| WO | 1993006031 | 4/1993 |
| WO | 1996025302 | 8/1996 |
| WO | 2003024815 | 3/2003 |
| WO | 2006039757 | 4/2006 |
| WO | 2007005054 | 1/2007 |
| WO | 2007057398 | 5/2007 |
| WO | 2007061310 | 5/2007 |
| WO | 2008012513 | 1/2008 |
| WO | 2009087338 | 7/2009 |
| WO | 2010026235 | 3/2010 |
| WO | 2012021447 | 2/2012 |
| WO | 2012058059 | 5/2012 |
| WO | 2011099358 | 6/2013 |

OTHER PUBLICATIONS

Final Office Action dated Jan. 25, 2018 for co-pending U.S. Appl. No. 15/602,666.
Final Office Action dated Feb. 6, 2018 for co-pending U.S. Appl. No. 15/475,354.
Non-Final Office Action dated Feb. 9, 2018 for co-pending U.S. Appl. No. 15/587,926.
Non-Final Office Action dated Feb. 15, 2018 for co-pending U.S. Appl. No. 14/922,836.
Final Office Action dated Dec. 27, 2017 for co-pending U.S. Appl. No. 14,943,182.
International Search Report for related International Application No. PCT/US2012/066639, dated Feb. 25, 2013.
International Search Report for related International Application No. PCT/US2013/035442, dated Jun. 23, 2013.
International Search Report for related International Application No. PCT/US2013/032819, dated May 23, 2013.
International Search Report for related International Application No. PCT/US2013/049028, dated Mar. 4, 2014.
International Preliminary Report on Patentability for PCT/US2012/066639, dated Feb. 26, 2013.
International Preliminary Report on Patentability for PCT/US2013/032819, dated Sep. 23, 2014.
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, filed Sep. 23, 2011. (21 pages).
International Search Report for PCT/US2015/024810, dated Jul. 8, 2015. (13 pages).
European Search Report for Application No. 15167039.5, dated Sep. 8, 2015. (7 pages).
SandBox Logistics, "Mine to Wellhead Logistics," Houston, TX, May, 2013.
SandBox Logistics, LLC, screenshots from video made in Apr. 2013 and publicly shown in May 2013, Amegard, North Dakota.
International Search Report for PCT/US15/35635, dated Oct. 30, 2015. (12 pages).
PCT International Search Report for PCT/US15/49074, dated Dec. 17, 2015. (11 pages).
PCT International Search Report for PCT/US15/57601, dated May 6, 2016. (11 pages).
SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.
Non-Final Office Action dated Apr. 29, 2016 for co-pending U.S. Appl. No. 14/943,182.
Final Office Action dated Sep. 15, 2016 for co-pending U.S. Appl. No. 14/882,973.

(56) References Cited

OTHER PUBLICATIONS

Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Smith, Ryan E., Prefab Architecture, A Guide to Modular Design and Construction, John Wiley & Sons, Inc., 2010.
Osha-Niosh, Hazard Alert: Worker Exposure to Silica during Hydraulic Fracturing, Jun. 2012.
Tremoglie, Michael P., Legal NewsLine, OSHA, NIOSH issue fracking health alert (/stories/510527440-oshaniosh-issue-fracking-health-alert), Jun. 25, 2012.
Beckwith, Robin, Proppants: Where in the World, Journal of Petroleum Technology, Apr. 2011.
Final Office Action dated Feb. 27, 2018 for co-pending U.S. Appl. No. 15/143,942.
Arrows Up, Inc., Jumbo BTS—Bulk Transport System, Aug. 1, 2014.
Arrows Up, Inc., Reusable Packaging Association, Member Spotlight: John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Final Office Action dated Sep. 27, 2016 for co-pending U.S. Appl. No. 13/555,635.
Non- Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924.
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/663,855.
Final Office Action dated Aug. 6, 2015 for co-pending U.S. Appl. No. 13/660,855.
Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. Appl. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,613.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
Yergin, Daniel, The Quest: Energy, Security, and the Remaking of the Modern World, 2011.
Gold, Russell, The Boom: How Fracking Ignited the American Energy Revolution and Changed the World, 2014.
Yergin, Daniel, Stepping on the Gas, Wall Street Journal, Apr. 2, 2011.
Raimi, Daniel et al., Dunn County and Watford City, North Dakota: A case study of the fiscal effects of Bakken shale development, Duke University Energy Initiative, May 2016.
Local Economic Impacts Related to Marcellus Shale Development, The Center for Rural Pennyslvania, Sep. 2014.
Eagle Ford Shale Task Force Report, Railroad Commission of Texas, Convened and Chaired by David Porter, Mar. 2013.
*Sandbox Logistics LLC et al v. Grit Energy Solutions LLC*, 3:16-cv-00012, 73.Parties' P.R. 4-3 Joint Claim Construction and Prehearing Statement by Oren Technologies LLC, SandBox Enterprises Llc, SandBox Logistics LLC, Nov. 17, 2016.
Beard, Tim, Fracture Design in Horizontal Shale Wells—Data Gathering to Implementation, EPA Hydraulic Fracturing Workshop, Mar. 10-11, 2011.
Economic Impact of the Eagle Ford Shale, Center for Community and Business Research at the University of Texas at San Antonio's Institute for Economic Development, Sep. 2014.

(56) References Cited

OTHER PUBLICATIONS

Kelsey, Timothy W. et al., Economic Impacts of Marcellus Shale in Pennsylvania: Employment and Income in 2009, The Marcellus Shale Education & Training Center, Aug. 2011.
2006 Montana Commercial Vehicle Size and Weight and Safety Trucker's Handbook, Montana Department of Transportation Motor Carrier Services Division, Fifth Edition, Jun. 2010.
Budzynski, Brian W., Never Meant to Take the Weight, Roads & Bridges, Apr. 2015.
Interstate Weight Limits, 23 C.F.R. § 658, Apr. 1, 2011.
Vin Requirements, 49 C.F.R. § 565, Oct. 1, 2011.
Benson, Mary Ellen et al., Frac Sand in the United States—A Geological and Industry Overview, U.S. Department of the Interior, U.S. Geological Survey, 2015-2017.
Beekman, Thomas J. et al., Transportation Impacts of the Wisconsin Fracture Sand Industry, Wisconsin Department of Transportation, Mar. 2013.
U.S. Silica Company, Material Safety Data Sheet, Jan. 2011.
Texas Transportation Code, Chapter 621, General Provisions Relating to Vehicle Size and Weight (Sec. 621.101 effective Sep. 1, 2005 and Section 621.403 effective Sep. 1, 1995).
Garner, Dwight, Visions of an Age When Oil Isn't King, New York Times, Sep. 20, 2011.
Non-Final Office Action dated Sep. 8, 2017 for co-pending U.S. Appl. No. 15/475,354.
Non-Final Office Action dated Sep. 8, 2017 for co-pending U.S. Appl. No. 15/143,942.
International Search Report and Written Opinion for PCT/US17/34603 dated Aug. 22, 2017.
Non-Final Office Action dated Aug. 30, 2017 for co-pending U.S. Appl. No. 14/943,182.
Non-Final Office Action dated Aug. 4, 2017 for co-pending U.S. Appl. No. 13/625,675.
Randy Lafollette, Key Considerations for Hydraulic Fracturing of Gas Shales, May 12, 2010.
Case No. 4:17-cv-00589, Plaintiffs' P.R. 3-1 and 3-2 Infringement Contentions and Disclosures, Jun. 8, 2017.
Final Office Action dated Oct. 13, 2017 for co-pending U.S. Appl. No. 15/398,950.
Non-Final Office Action dated Sep. 27, 2017 for co-pending U.S. Appl. No. 14/996,362.
Final Office Action dated Sep. 21, 2017 for co-pending U.S. Appl. No. 14/922,836.
Non-Final Office Action dated Oct. 5, 2017 for co-pending U.S. Appl. No. 14/848,447.
Non-Final Office Action dated Sep. 21, 2017 for co-pending U.S. Appl. No. 15/413,822.
Non-Final Office Action dated Sep. 28, 2017 for co-pending U.S. Appl. No. 13/628,702.
Non-Final Office Action dated Oct. 27, 2016 for co-pending U.S. Appl. No. 15/219,676.
Non-Final Office Action dated Nov. 9, 2016 for co-pending U.S. Appl. No. 14/948,494.
Final Office Action dated Nov. 4, 2016 for co-pending U.S. Appl. No. 14/738,485.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920.
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S. Appl. No. 14/848,447.
Non-Final Office Action dated Dec. 9, 2016 for co-pending U.S. Appl. No. 14/927,614.
International Search Report for PCT Application No. PCT/US2016/050859 dated Dec. 9, 2016.
Non-Final Office Action dated Feb. 24, 2017 for co-pending U.S. Appl. No. 14/943,182.
Non-Final Office Action dated Feb. 14, 2017 for co-pending U.S. Appl. No. 14/943,111.
Final Office Action dated Mar. 7, 2017 for co-pending U.S. Appl. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Apr. 3, 2017 for co-pending U.S. Appl. No. 13/555,635.
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.
Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.
Final Office Action dated Jun. 1, 2017 for co-pending U.S. Appl. No. 13/628,702.
Final Office Action dated Jul. 3, 2017 for co-pending U.S. Appl. No. 14/923,920.
Non-Final Office Action dated Jun. 28, 2017 for co-pending U.S. Appl. No. 15/589,185.
Final Office Action dated Jun. 7, 2017 for co-pending U.S. Appl. No. 14/848,447.
Final Office Action dated Jun. 28, 2017 for co-pending U.S. Appl. No. 14/485,687.
Final Office Action dated Jun. 6, 2017 for co-pending U.S. Appl. No. 14/927,614.
Final Office Action dated Jun. 21, 2017 for co-pending U.S. Appl. No. 14/943,182.
Non-Final Office Action dated Jul. 26, 2017 for co-pending U.S. Appl. No. 15/463,201.
Final Office Action dated Jul. 27, 2017 for co-pending U.S. Appl. No. 14/738,485.
Non-Final Office Action dated Aug. 3, 2017 for co-pending U.S. Appl. No. 15/219,676.
Beckwith, Robin, Proppants: Where in the World, Proppant Shortage, JPT, Apr. 2011 (6 pages).
Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, Bj Services Company, Sep. 9, 2010 (53 pages).
WW Trailers Inc., Model GN2040EZ datasheet, Portland, OR, Jan. 2007 (4 pages).
WW Trailers Inc., Model GN204S9A datasheet, Portland, OR, Jan. 2007 (4 pages).
Non-Final Office Action dated Apr. 26, 2018 for co-pending U.S. Appl. No. 15/616,783.
Final Office Action dated Apr. 23, 2018 for co-pending U.S. Appl. No. 14/848,447.
Final Office Action dated Mar. 16, 2018 for co-pending U.S. Appl. No. 14/996,362.

(56) References Cited

OTHER PUBLICATIONS

Final Office Action dated Mar. 14, 2018 for co-pending U.S. Appl. No. 15/144,450.
ISO 1496-1: International Standard, Series 1 Freight Containers—Specification and Testing—Part 1, General Cargo Containers, Fifth Edition, Aug. 15, 1990.
ISO 6346: International Standard, Freight Containers—Coding, Identification and Marking, Third Edition, Dec. 1, 1995.
ISO/IEC 15416: International Standard, Information Technology—Automatic Identification and Data Capture Techniques—Bar Code Print Quality Test Specification—Linear Symbols, First Edition, Aug. 15, 2000.
Hoel, Lester A., Giuliano, Genevieve and Meyer, Michael D., Portions of Intermodal Transportation: Moving Freight in a Global Economy, Copyright Eno Transportation Foundation, 2011.
International Organization for Standardization, ISO 668:1995(E).
International Organization for Standardization, ISO 668:1995(E)/Amd.1:2005(E).
International Organization for Standardization, ISO 668:1995(E)/Amd2:2005(E).
International Organization for Standardization, ISO 1496-1:1990/Amd.1:1993(E).
International Organization for Standardization, ISO 1496-1:1990/Amd.2:1998(E).
International Organization for Standardization, ISO 1496-1:1990/Amd.3:2005(E).
International Organization for Standardization, ISO 1496-1:1990/Amd.4:2006(E).
International Organization for Standardization, ISO 1496-1:1990/Amd.5:2006(E).
Rastikian, K. et al., Modelling of sugar drying in a countercurrent cascading rotary dryer from stationary profiles of temperature and moisture, Journal of Food Engineering 41 (1999).

SYSTEM AND METHOD FOR DELIVERING PROPPANT TO A BLENDER

1. RELATED APPLICATIONS

This application is a continuation, and claims priority to, and the benefit of, U.S. Non-Provisional application Ser. No. 15/587,926, filed May 5, 2017, titled "System and Method for Delivering Proppant To A Blender," which is a continuation of U.S. Non-Provisional application Ser. No. 15/260,371, filed Sep. 9, 2016, titled "System and Method for Delivering Proppant To A Blender," now U.S. Pat. No. 9,676,554, issued Jun. 13, 2017, which is a continuation-in-part of U.S. Non-Provisional application Ser. No. 14/854,622, filed Sep. 15, 2015, titled "System and Method for Delivering Proppant To A Blender," now U.S. Pat. No. 9,670,752, issued Jun. 6, 2017, which claims priority to, and the benefit of U.S. Provisional Application No. 62/217,117, filed Sep. 11, 2015, titled "System and Method for Delivering Proppant To A Blender" and U.S. Provisional Application No. 62/050,752, filed Sep. 15, 2014, titled "System and Method for Delivering Proppant To A Blender," each of which are incorporated herein by reference in their entireties.

BACKGROUND

Summary

In an embodiment, a system for conveying proppant includes a conveyor assembly having a conveyor belt, the conveyor belt receiving proppant from one or more containers having proppant stored therein distributed along the conveyor assembly and carrying the proppant away from the containers. The system also includes a conveyor auxiliary unit connected to an end of the conveyor assembly having one or more joints to enable expansion and collapse of the conveyor belt from the conveyor assembly so as further to extend along the conveyor auxiliary unit. The system further includes a proppant chute positioned at an end of the conveyor auxiliary unit, the proppant chute having an opening to direct the proppant from the conveyor belt into a blending hopper, the proppant chute being positioned at a higher elevation than an inlet of the blending hopper such that the proppant exits the proppant chute into the blending hopper via gravity feed.

In another embodiment, a system to convey proppant includes a conveyor assembly to receive and support one or more containers having proppant stored therein. The system also includes a conveyor belt positioned beneath the one or more containers to receive the proppant dispensed from the one or more containers and to transport the proppant away from the one or more containers. Moreover, the system includes a conveyor auxiliary unit positioned at an end of the conveyor assembly, the conveyor auxiliary unit having an inclined section that increases a vertical position of the conveyor belt relative to a ground plane, one or more joints positioned along the conveyor assembly to enable expansion and compaction of the conveyor belt, and a proppant chute positioned at the end of the conveyor assembly, the proppant chute moveable to direct the proppant away from the convey belt. Additionally, the system includes a blending hopper positioned proximate the conveyor assembly to receive and mix the proppant with one or more proppant fluids for injection into a well. The system also includes a tub positioned at an inlet of the blending hopper between the blending hopper and the proppant chute, the tub being removable from the blending hopper and positioned at a lower elevation than the proppant chute when coupled to the blending hopper.

In a further embodiment, a method includes dispensing proppant from a container positioned on a conveyor assembly onto a conveyor belt. The method also includes transporting the proppant, via the conveyor belt, away from the container and toward a conveyor assembly. The method further includes transferring the proppant to a proppant chute such that the elevation of the proppant on the conveyor belt is increased. The method also includes directing the proppant into a blending hopper via gravity feed.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Figure 1:
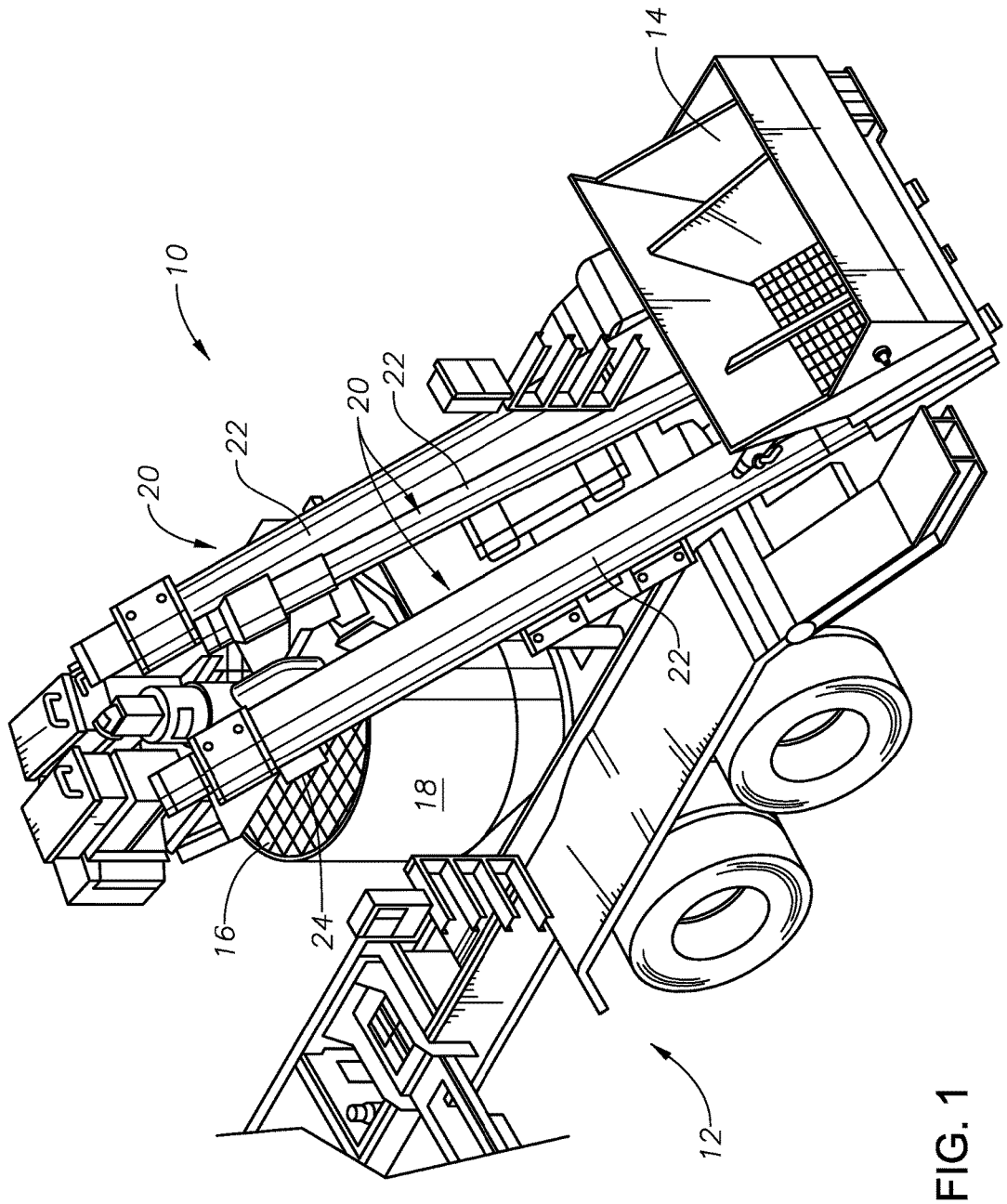
FIG. 1 is a rear perspective view of a blender unit, in accordance with embodiments of the present disclosure.
Figure 2:
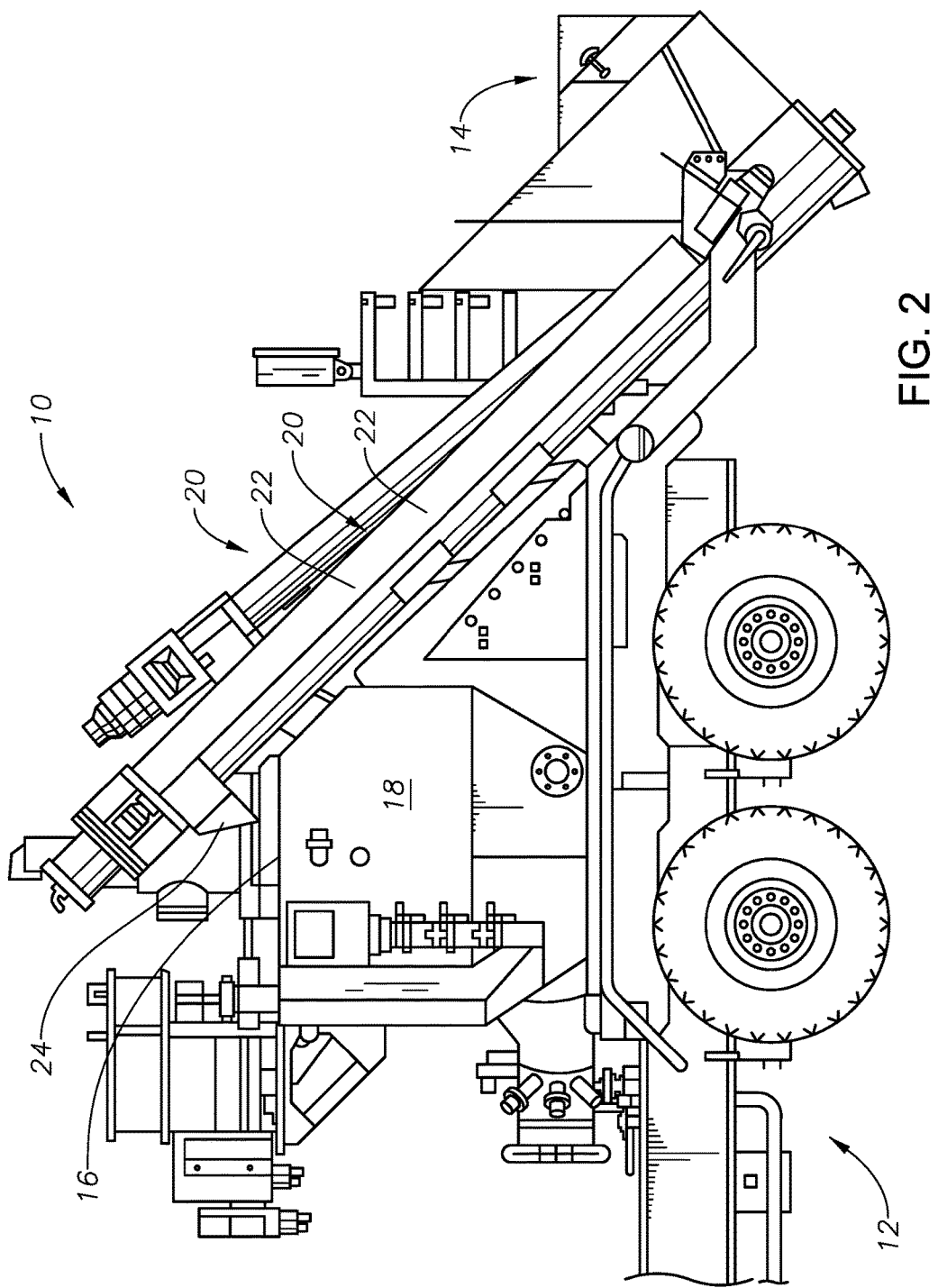
FIG. 2 is a side elevational view of the blender unit of FIG. 1, in accordance with embodiments of the present disclosure.
Figure 3:
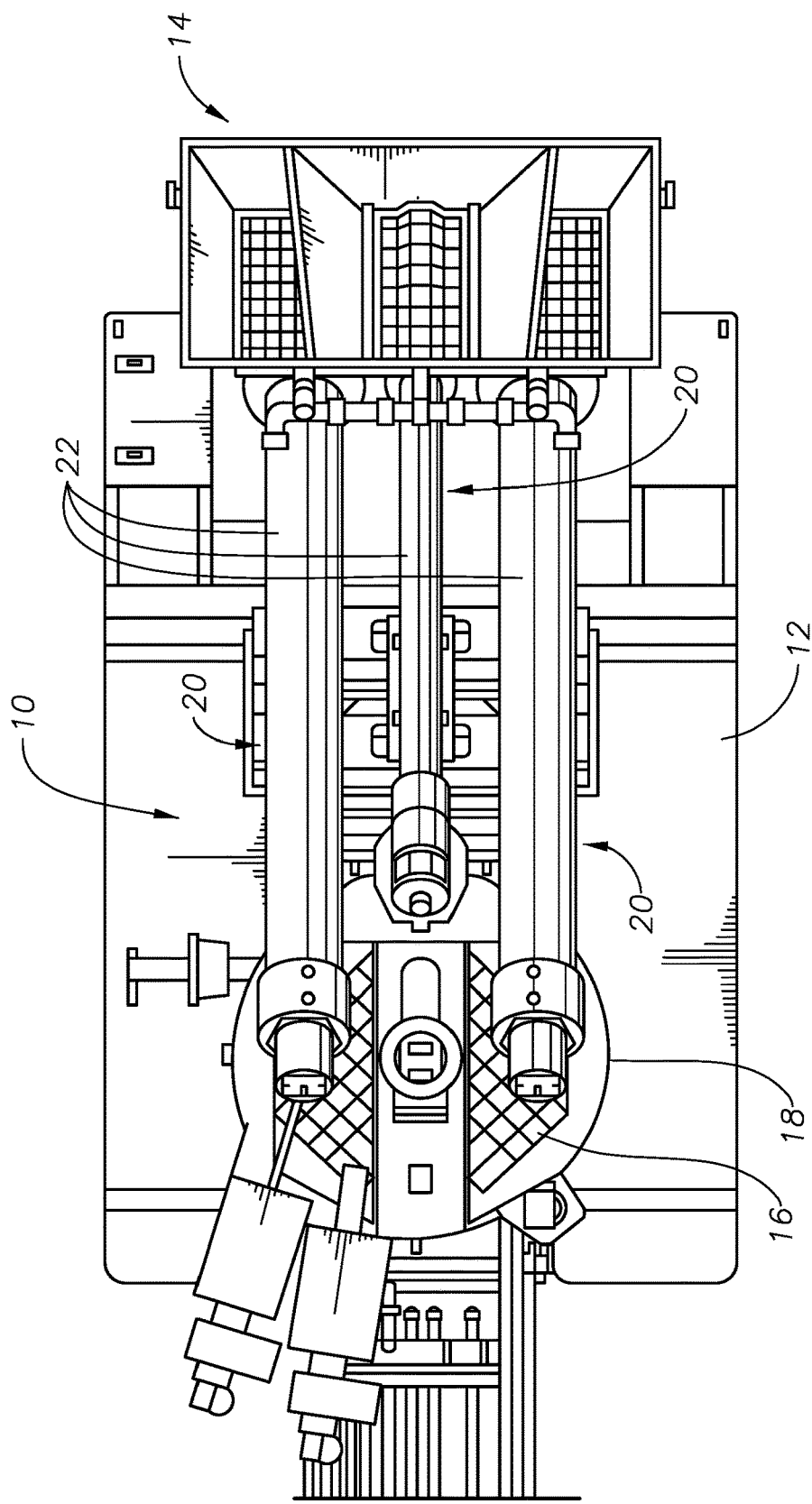
FIG. 3 is a top plan view of the blender unit of FIG. 1, in accordance with embodiments of the present disclosure.

FIGS. 1-3 illustrate a proppant blender unit 10 mounted on a trailer 12 for ease of transport. In operation, the blender unit 10 mixes proppant at a well site prior to introduction of the proppant into a well during a hydraulic fracturing operation. In the illustrated embodiment, the blender unit 10 has a tub 14 for receiving proppant from a conveyor (not shown). As shown, the tub 14 is arranged to receive the proppant and includes walls to enable large volumes of proppant to be stored in the tub 14 before the proppant is transported along the blender unit 10. For example, in certain embodiments, proppant may be loaded into the tub 14 and gradually moved along the blender unit 10 as the proppant is transported via one or more moving devices, such as augers. As illustrated, an inlet of a blending hopper 18 is arranged at a higher elevation than the tub 14. As a result, the proppant positioned in the tub 14 is lifted to a higher elevation to enable deposition into the blending hopper 18. In the illustrated embodiment, auger units 20 extend from the tub 14 to the inlet 16 and move and direct the proppant out of the tub 14. Furthermore, as shown in FIG. 1, the auger units 20 include an auger housing 22 that encases an auger screw (now shown). As the auger screw turns, the surfaces of the screw lift the proppant from the tub 14, through the auger housing 22 and upward to the inlet 16 of the blending hopper 18. At the inlet 16 of the blending hopper 18, the proppant is expelled from the auger housing 22 into the inlet 16 through a proppant chute 24.

Fracking proppant is a highly dense, often very hard and/or coarse material. As a result, the auger screws of the auger units 20 can quickly become worn and ineffective. For example, the friction between the proppant and the auger screws may wear down the helical sweep of the screw, thereby reducing the amount of proppant the auger screws can transport. In this manner, the blending of proppant has reduced efficiencies that may lead to delays in production and fracturing operations at a well site. Moreover, because the auger screws may be worn quickly, stoppages in work may be frequent to replace the auger screws. Again, stoppages to replace the auger screws reduce the efficiencies of the fracturing operations, thereby increasing costs.

Embodiments of the present disclosure include a conveyor auxiliary unit used in conjunction with a system for delivering proppant. As will be described below, by utilizing the conveyor auxiliary unit, the tub 14 may be positioned directly above the inlet 16 of the blending hopper 18. As a result, use of the auger units 20 can be eliminated, thereby improving efficiencies at the well site.

Figure 4:
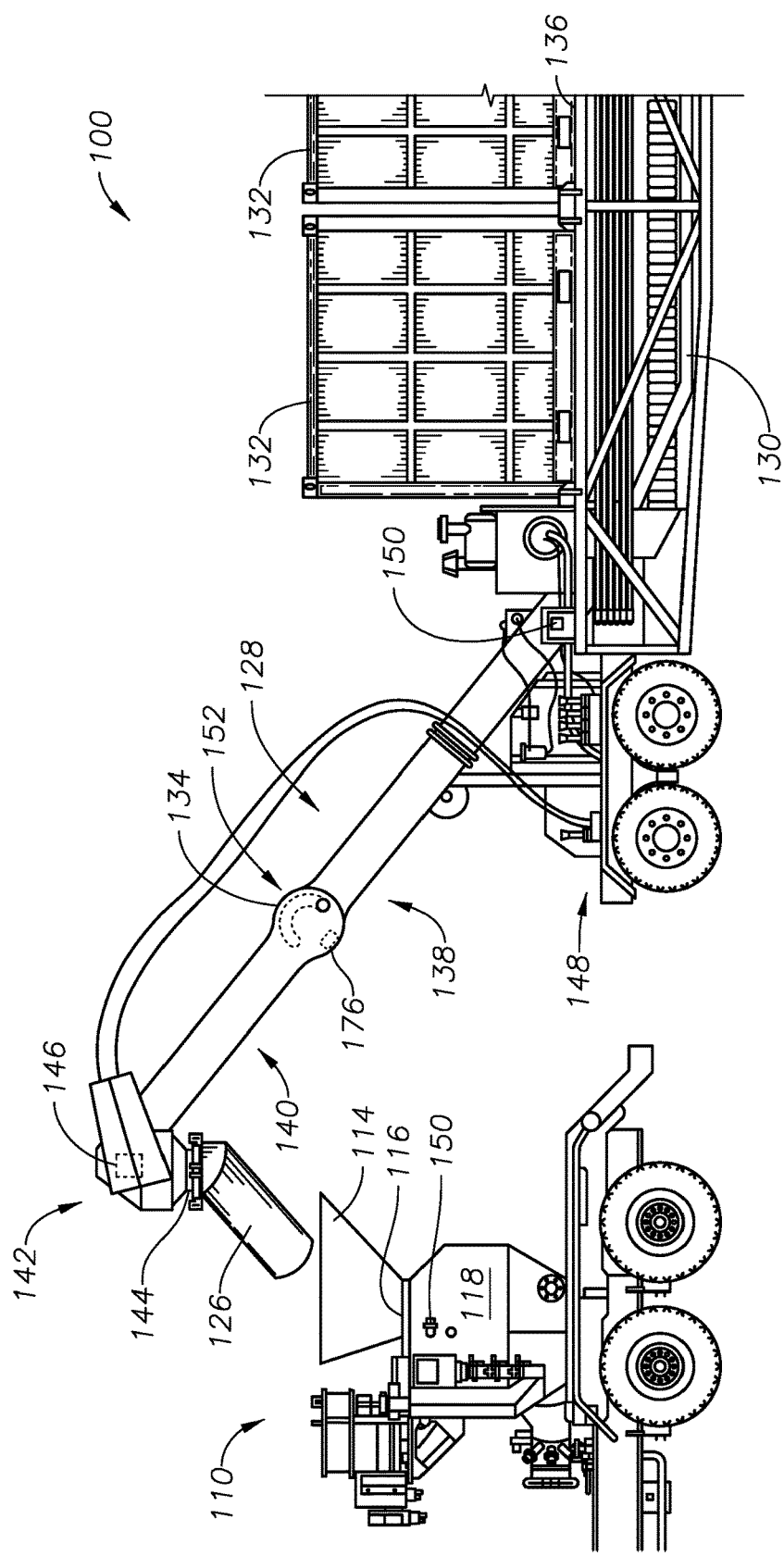
FIG. 4 is a side elevational view of a blender unit and proppant delivery system, in accordance with embodiments of the present disclosure.

FIG. 4 is a schematic side elevational view of an embodiment of a proppant delivery system 100 arranged proximate a well site having a proppant blender unit 110. It should be appreciated that certain features of the proppant delivery system 100 have been omitted for clarity and conciseness in the foregoing discussion. The proppant delivery system 100 utilizes modular, stackable, sealed proppant containers 132 to transport proppant for delivery, dispersion, and use at the well site. For example, the proppant containers 132 may be loaded onto trucks and transported to the well site from a sand mine, transloading facility, or the like. Moreover, the modular, pre-loaded boxes reduce demurrage typically experienced at well sites due to unloading sand from bulk pneumatic containers. It will be appreciated that, in certain embodiments, features of the proppant delivery system enable the efficient loading, unloading, and transportation of proppant at the well site.

In the illustrated embodiment, the proppant delivery system 100 includes a conveyor assembly 128 having a conveyor belt 130 positioned to underlie the containers 132. In certain embodiments, the conveyor assembly 128 includes a surface 136 to receive and support the containers 132 in a side-by-side configuration. As a result, the containers 132 can be positioned above the conveyor belt 130 to enable gravity feed of the proppant out of the containers 132. The conveyor belt 130 collects sand from the proppant containers 132 directly from the outlets (not shown) in the bottom of the respective containers 132. As the conveyor belt 130 receives the proppant, the conveyor belt 130 transports the proppant along the length of the surface 136 to an elevated section 138 of the conveyor assembly 128. As will be described below, the conveyor belt 130 continues through the elevated section 138 and extends to a chute 126 arranged above the inlet 116 of the tub 114. In the illustrated embodiment, the elevated section 138 is at an elevation higher than an elevation of the conveyor belt 130 when the conveyor belt 130 is positioned below the containers 132. That is, the elevated section 138 is higher than the surface 136. In this manner, the conveyor belt 130 can transport the proppant to the chute 126 for deposition into the tub 114 and the blending hopper 118 without utilizing the auger units 20 because the tub 114 can gravity feed the proppant into the inlet 116 of the blending hopper 118.

In the illustrated embodiment, the conveyor assembly 128 is collapsible and extendable by use of the conveyor auxiliary unit 140. That is, the conveyor auxiliary unit 140 enables expansion and collapse of the conveyor belt 130. As shown, the conveyor auxiliary unit 140 is coupled to the conveyor assembly 128 via one or more joints 134. In certain embodiments, the joint 134 is coupled to the conveyor assembly 128 via a hinged and/or ball-and-socket configuration. That is, the joint 134 enables the conveyor auxiliary unit 140 to pivot about an axis. In the illustrated embodiment, the conveyor auxiliary unit 140 includes the chute 126 positioned at a far end 142. The chute 126 is coupled to the conveyor auxiliary unit 140 via a pivoting connection 144 driven by an actuator 146 coupled to a control system 148. As will be described below, the actuator 146 enables the chute 126 to rotate about an axis, thereby facilitating different positions of the chute 126 to accommodate a variety of well site configurations.

In certain embodiments, the joint 134 enables compact storage of the conveyor assembly 128 and/or the conveyor auxiliary unit 140 while the proppant delivery system 100 is not in use. Moreover, the joint 134 enables the conveyor auxiliary unit 140 to collapse during transportation of the proppant delivery system 100, thereby reducing the height of the proppant delivery system for travel along roadways having height and/or weight restrictions for commercial loads. Moreover, the joint 134 enables use of the conveyor assembly 128 and the conveyor auxiliary unit 140 with both elevated blending hoppers 118 and conventional blending units where the hopper is close to the ground. As such, removal of the conveyor auxiliary unit 140 will not be necessary when utilizing multiple different blending units on one well site, thereby improving efficiencies and increasing the variety of equipment suitable for use with the proppant delivery system 100.

In certain embodiments, the joint 134 includes a slot and pin connection 152 to enable movement of the joint 134 (e.g., rotation of the conveyor auxiliary unit 140 about the axis) a predetermined distance. For example, the pin fits within the slot and travels the circumferential difference allowed by the slot. In this manner, over-rotation of the conveyor auxiliary unit 140 may be reduced, thereby improving longevity and decreasing wear and tear on the equipment.

Furthermore, in certain embodiments, the tub 114 may be removable from the blending hopper 118 to also enable transportation along roadways. For example, the tub 114 may be removed and stored when the proppant blender unit 110 is not in operation. In certain embodiments, the tub 114 may be stored on the trailer 12 of the proppant blender unit 110 to keep the tub 114 close by the blending hopper 118 to reduce the likelihood of losing or damaging the tub 114.

As described above, the control system 148 may be utilized to monitor and control operations of the proppant delivery system 100. For example, one or more sensors 150 may be utilized to measure the flow of proppant into the blending hopper 118, measure the weight of the proppant in the tub 114 and/or the containers 132, measure a speed of the conveyor belt 130, measure the rate of discharge from the containers 132, measure a proppant level in the tub 114, or the like. As will be known by one skilled in the art, the position of these sensors 150 and the types of sensors used may vary based on the application. For example, a weight sensor may be used to measure the weight of proppant in the tub 114, and thereby the flow of proppant into the blending hopper 118, while a speed sensor may be used to monitor the speed of the conveyor belt 130.

Figure 5:
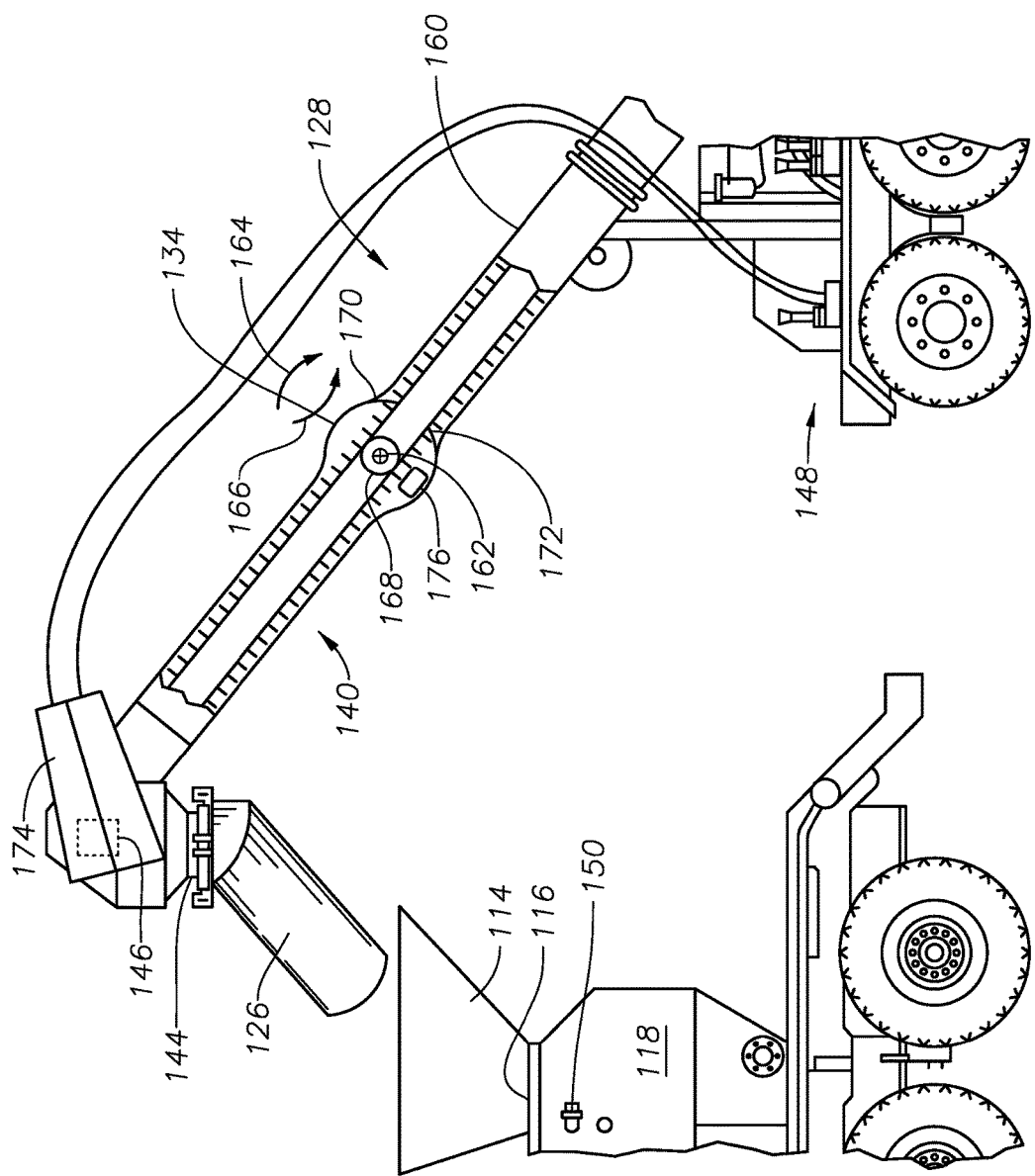
FIG. 5 is a partial side elevational view of a conveyor auxiliary unit, in accordance with embodiments of the present disclosure.

FIG. 5 is a partial schematic side elevational view of the conveyor assembly 128 and the conveyor auxiliary unit 140. In the illustrated embodiment, a cover 160 arranged about the conveyor assembly 128 and the conveyor auxiliary unit 140 is partially removed for clarity. In the illustrated embodiment, the conveyor belt 130 extends along the conveyor assembly 128 and the conveyor auxiliary unit 140 toward the chute 126. As shown, the conveyor belt 130 in the illustrated embodiment is an endless conveyor that loops around at each end, thereby facilitating transportation of the proppant from the containers 132. The proppant is transported along the conveyor belt 130 and deposited into the tub 114 positioned above the inlet 116 of the blending hopper 118. In this manner, the auger units 20 may be eliminated, thereby improving efficiencies of fracturing operations.

As illustrated, the joint 134 is a ball-and-socket connection in which the conveyor auxiliary unit 140 is coupled to the conveyor assembly 128 and pivotable about an axis 162. That is, the conveyor auxiliary unit 140 can increase its elevation relative to a ground plane by rotating about the axis 162 in a first direction 164 and decrease its elevation relative to the ground plane by rotating about the axis 162 in the second direction 166. As illustrated, the joint 162 includes a fastener 168 (e.g., a pin, a bolt, a rod, a geared tooth, etc.) to rotatably couple the conveyor auxiliary unit 140 to the conveyor assembly 128. Moreover, as illustrated, the conveyor auxiliary unit end 170 acts as the ball and the conveyor assembly end 172 acts as the socket to enable rotation of the conveyor auxiliary unit 140 about the axis 162. That is, the conveyor auxiliary unit end 170 may fit into the conveyor assembly end 172. However, it should be appreciated, that in other embodiments the joint 134 may be of a different type. For example, the joint 134 may be a hinge joint, a screw joint, a saddle joint, a plane joint, an ellipsoid joint, a universal joint, an elbow joint, or the like. It should be appreciated that the joint 134 is utilized to facilitate a rotatable connection between the conveyor assembly 128 and the conveyor auxiliary unit 140, and therefore, a variety of different connections may be utilized without departing from the scope of the present disclosure. As a result, the conveyor auxiliary unit 140 may be utilized to position the chute 126 over the tub 114 to enable gravity feed of the proppant into the blending hopper 118.

In the illustrated embodiment, the control system 148 is communicatively coupled to a control hub 174. However, it should be appreciated that, in certain embodiments, the control hub 174 may not be utilized. For example, all actuators, drivers, sensors, and the like in the system may be communicatively coupled directly to the control system 148. As described above, in certain embodiments, the actuator 146 is arranged proximate the pivoting connection 144 to enable movement of the chute 126 to accommodate different configurations at a well site. Moreover, in certain embodiments, the control hub 174 may be communicatively coupled to the joint 134 to direct movement of the joint about the axis 162. However, as described above, the joint 134 may be in direct communication with the control system 148. For example, the joint 162 may include a drive unit 176, such as an electric motor and gear unit, to drive movement of the conveyor auxiliary unit 140 about the axis 162. In this manner, an operator can control the position of the conveyor auxiliary unit 140 from a distance, thereby reducing the likelihood of interference with ongoing fracturing operations. However, in certain embodiments, the position of the conveyor auxiliary unit 140 may be manually operated. Additionally, the fastener 168 may include stops to block rotation of the conveyor auxiliary unit 140. Moreover, the stops may be utilized to block over-rotation of the conveyor auxiliary unit 140.

Figure 6:
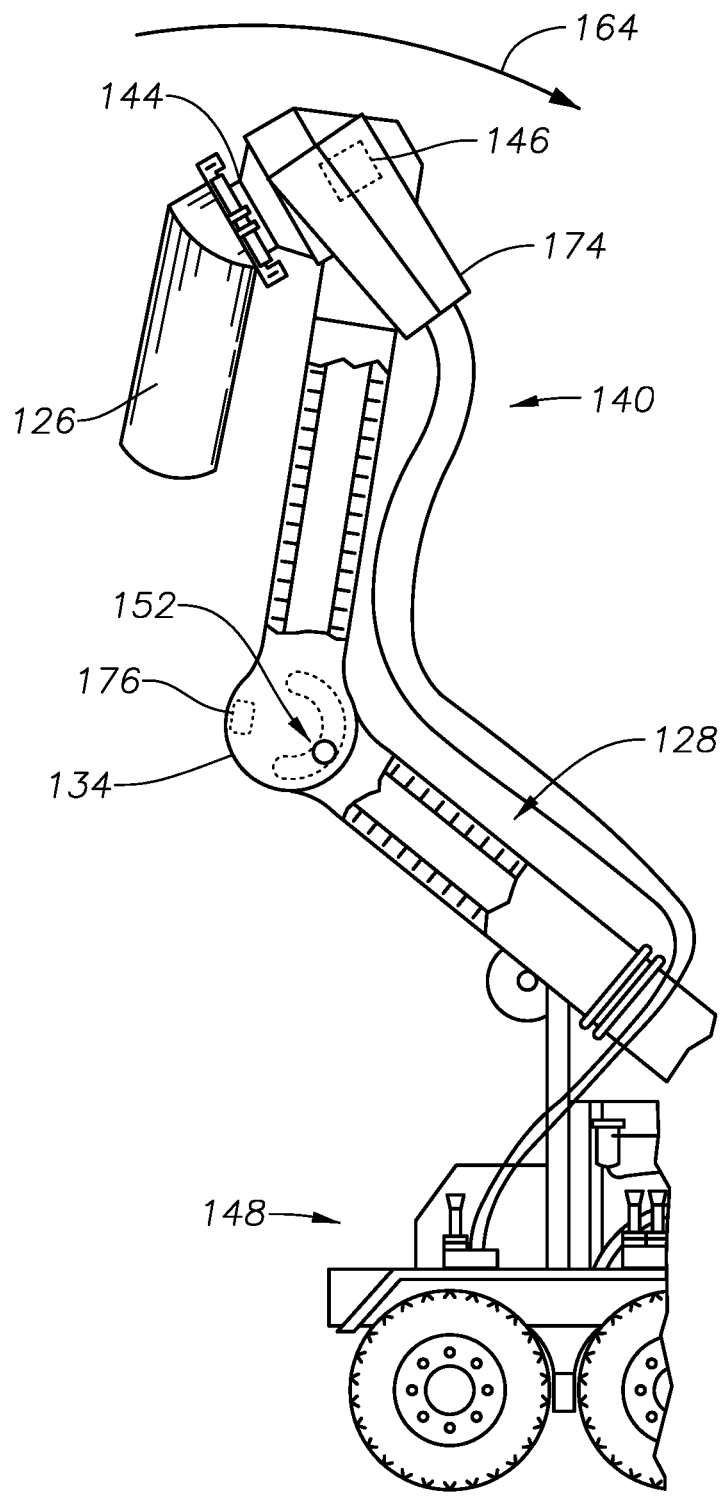
FIG. 6 is a partial side elevational view of a conveyor auxiliary unit, in accordance with embodiments of the present disclosure.

FIG. 6 is a partial schematic side elevational view of an embodiment of the conveyor auxiliary unit 140 moving in the first direction 164 to thereby increase an elevation of the chute 126 relative to the ground plane. As shown, the conveyor auxiliary unit 140 rotates in the first direction 164 about the axis 162 to raise the elevation of the chute 126 relative to the ground plane and above the tub 114. In this manner, proppant blender units 110 with elevated blending hoppers 118 may receive proppant via the chute 126 to a tub 114 arranged directly over the blending hopper 118, thereby eliminating the need for the auger units 20 and improving overall efficiency and reliability of fracturing operations. In the illustrated embodiment, the slot and pin connection 152 restricts rotation of the conveyor auxiliary unit 140. In certain embodiments, the drive unit 176 controls movement of the conveyor auxiliary unit 140 via the control system 148. In certain embodiments, the stops are operable with the drive unit 176 to block over-rotation of the conveyor auxiliary unit 140. However, in other embodiments, the conveyor auxiliary unit 140 may be manually moved to rotate about the axis 162. As illustrated, even when the elevation of the chute 126 is increased, relative to the ground plane, the conveyor belt 130 is still arranged within the conveyor assembly 128 and the conveyor auxiliary unit 140 such that the proppant can be delivered to the blending hopper 118 via the chute 126.

Figure 7:
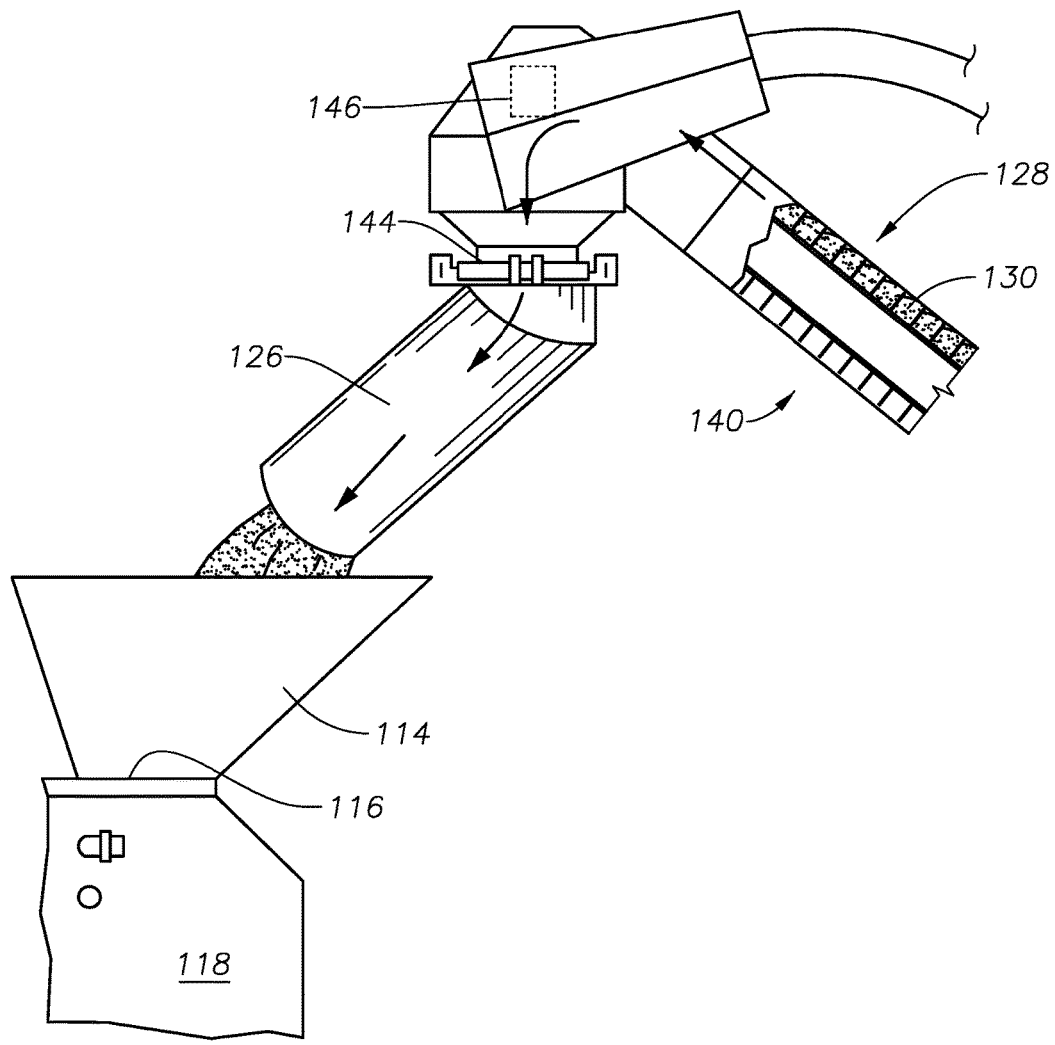
FIG. 7 is a partial side elevational view of a chute of a conveyor assembly, in accordance with embodiments of the present disclosure.

FIG. 7 is a partial schematic side elevational view of the chute 126 directing proppant into the tub 114 arranged above the blending hopper 118 through an opening in the chute 126. As illustrated, the proppant is conveyed along the conveyor belt 130 toward the chute 126. From the chute 126, the proppant is gravity fed downward into the tub 114 arranged over the inlet 116 of the blending hopper 118. As described above, by positioning the tub 114 over the blending hopper 118 the use of the auger units 20 may be eliminated, thereby reducing the likelihood of work stoppages for repair and replacement of the auger screws.

In the illustrated embodiment, the sensor 150 is arranged proximate the tub 114 to monitor the weight of the proppant in the tub 114. For example, the sensor 150 may include a weight sensor that is in communication with the control system 148 (e.g., via a wired or wireless communication system), such as via BLUETOOTH, IEEE 802.11 networks, cellular networks, Ethernet, USB, or the like. In certain embodiments, the control system 148 may receive information from the sensor 150 (such as the weight of proppant in the tub 114) and change operation of the proppant delivery system 110 based on the information. For example, if the weight of the proppant in the tub 114 is over some predetermined threshold, the control system 150 may be utilized to slow the speed of the conveyor belt 130 and/or slow the drainage of proppant from the containers 132 to prevent overfilling the tub 114. Moreover, if the weight of the proppant in the tub 114 is too low, the control system 148 may speed up the conveyor belt 130, thereby directing more proppant to the tub 114. Similarly, other sensors 150 may be utilized in a similar manner to control operations of the proppant delivery system 100. For example, the speed of the conveyor 130, the weight of the proppant in the tub 114, the level in the tub 114, the rate of discharge from the containers 132, and the like may all be utilized to determine an efficient discharge and blending pace, thereby improving efficiencies and reducing undue strain on associated support equipment.

As illustrated in FIG. 7, the chute 126 is directed toward the tub 114 via the pivoting connection 144, controlled by the actuator 146 communicatively coupled to the control system 148. In certain embodiments, the actuator 146 may be coupled to the control hub 174. The actuator 146 drives rotational movement of the chute 126 to thereby direct the proppant to a desired location. In the illustrated embodiment, the desired location is the tub 114. However, it should be appreciated that the chute 126 may direct the proppant directly into the blending hopper 118, or any other suitable location.

Figure 8:
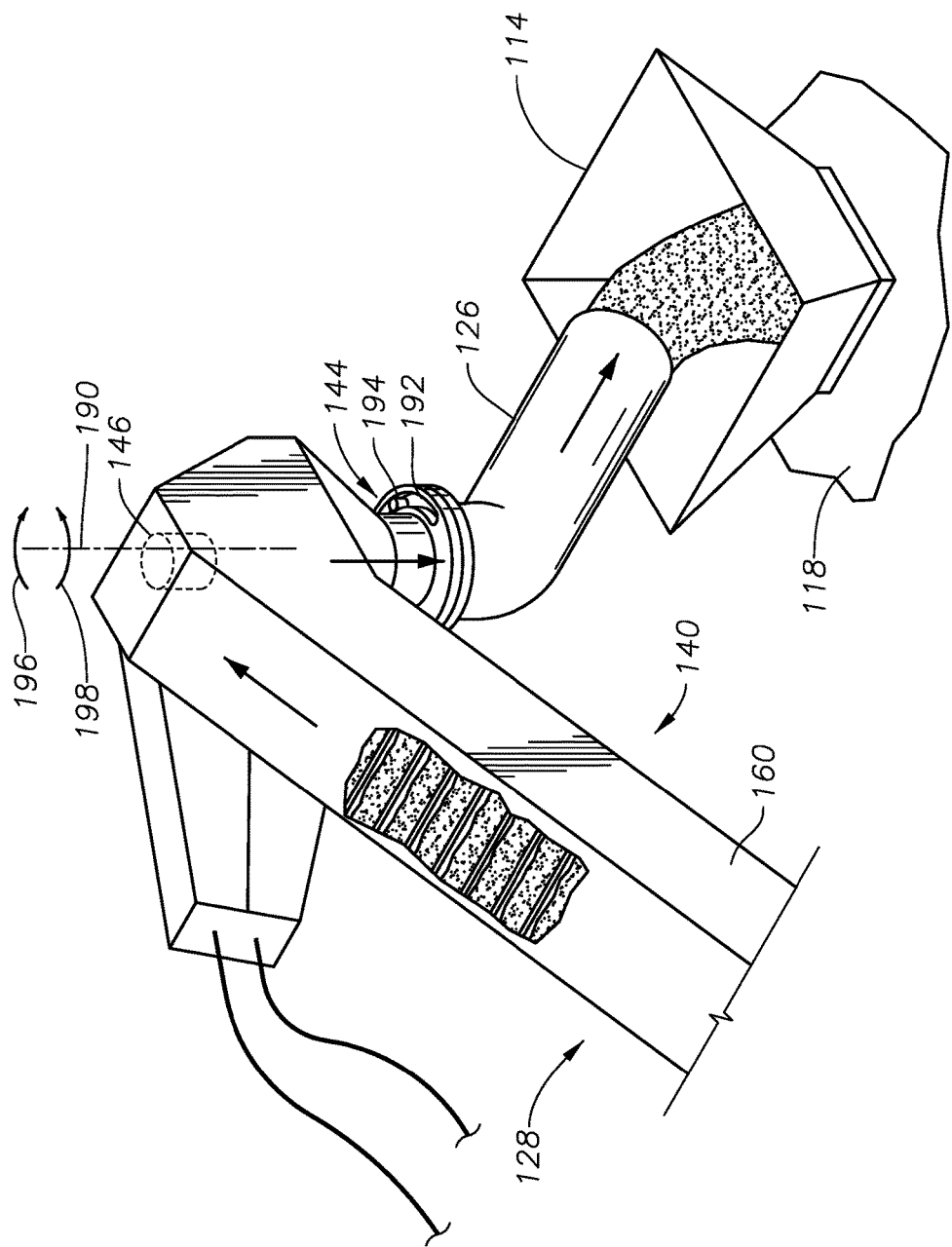
FIG. 8 is a rear perspective view of a chute positioned over a blending hopper, in accordance with embodiments of the present disclosure.

FIG. 8 is a rear perspective view of an embodiment of the chute 126 directing the proppant into the tub 114. As illustrated, the proppant is directed along the conveyor belt 130 through the conveyor assembly 128 and the conveyor auxiliary unit 140 toward the chute 126 for deposition within the tub 114. As described above, the chute 126 is arranged proximate the pivoting connection 144 to enable rotation about an axis 190 via the actuator 146. Rotation of the chute 126 enables operators to select the location of the proppant within the tub 114, thereby improving operating procedures. For example, if the operator notices that proppant is collecting or piling in a particular area of the tub 114, the operator can rotate the chute 126 (e.g., via the control system 148) to change the location of proppant deposition within the tub 114. As a result, operations are not halted to adjust the proppant within the tub 114.

In the illustrated embodiment, the pivoting connection 114 includes a slot 192 that receives a pin 194 to enable rotation of the chute 126 a predetermined distance about the axis 190. That is, the pin 194 extends into the slot 192 and travels a circumferential distance enabled by the slot 192. As described above, the actuator 146 may drive movement of the chute 126, and thereby drive movement of the pin 194 within the slot 192. However, it should be appreciated that other methods may be utilized to control the pivoting and/or rotation of the chute 126. For example, stops may be utilized to block rotation of the chute 126. In this manner, via the actuator 146, the chute 126 may rotate about the axis 190 in a first direction 196 and a second direction 198. Moreover, in certain embodiments, the chute 126 may be manually operated.

Figure 9:
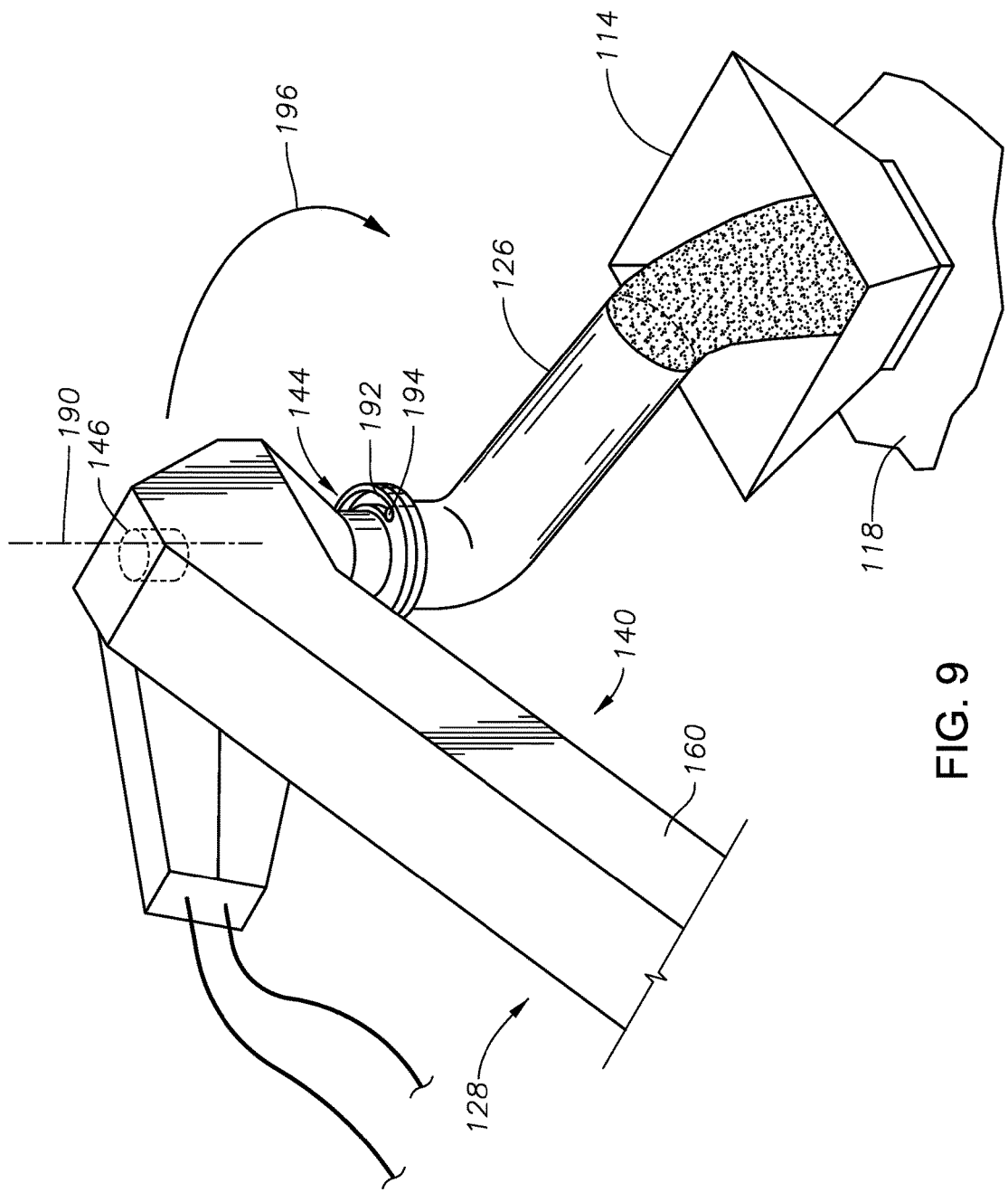
FIG. 9 is a rear perspective view of a chute positioned over a blending hopper, in accordance with embodiments of the present disclosure.

FIG. 9 is a rear perspective view of the chute 126 directing the proppant into the tub 114. As shown, compared to FIG. 8, the chute 126 has rotated in the first direction 196 such that the pin 194 is arranged at the end of the slot 192. That is, in the illustrated embodiment, the chute 126 has rotated as far in the first direction 196 as enabled by the slot 192. As described above, the actuator 146 drives movement of the chute 126 about the axis 190. In this manner, the proppant can be directed into the tub 114 such that the proppant does not pile up at one location, thereby enabling more efficient, smooth operation of the fracturing process. For example, if the proppant were to pile up in one location in the tub, the sensor 150 monitoring the level in the tub 114 may inadvertently send a signal to the control system 148 indicative of the high level, thereby interrupting operations. However, because of the pivoting chute 126, the proppant may be evenly distributed within the tub 114, thereby reducing the likelihood of the proppant piling up in one location.

As described above, the proppant delivery system 100 may be utilized with the proppant blender unit 110 to facilitate hydraulic fracturing operations. For example, proppant may be dispensed from the containers 132 onto the conveyor belt 130. The containers 132 are positioned on the conveyor assembly 128, in the illustrated embodiment. As the proppant is deposited on the conveyor belt 130, the proppant is transported, via the conveyor belt 130, away from the containers 132 and toward the conveyor auxiliary unit 140. Thereafter, the proppant is transferred from the conveyor belt 130 to the chute 126 such that the elevation of the proppant on the conveyor belt is increased. In other words, the proppant is transported along the elevated section 138 such that the elevation of the proppant is increased relative to the ground plane. Next, the proppant is directed into the blending hopper 118 via gravity feed. For example, the chute 126 and conveyor auxiliary unit 140 may position the proppant at an elevation greater than the blending hopper 118 and/or the tub 114. As a result, the proppant can be gravity fed from the chute 126 into the tub 114 and/or the blending hopper 118, thereby eliminating the use of the auger units 20. Moreover, in certain embodiments, the sensors 150 positioned about the system may be utilized to control operations via the control system 148. For example, the flow rate of the proppant to the blending hopper 118 can be adjusted via the control system 148 based on feedback from the sensor 150 monitoring the weight of the proppant in the tub 114. Moreover, the speed of the conveyor belt 130 may be adjusted based on feedback from the one or more downstream sensors 150 arranged along the system. In this manner, the control system 148, based on feedback from the various sensors 150, may control delivery of proppant to the blending hopper 118.

This application is a continuation, and claims priority to, and the benefit of, U.S. Non-Provisional application Ser. No. 15/587,926, filed May 5, 2017, titled "System and Method for Delivering Proppant To A Blender," which is a continuation of U.S. Non-Provisional application Ser. No. 15/260,371, filed Sep. 9, 2016, titled "System and Method for Delivering Proppant To A Blender," now U.S. Pat. No. 9,676,554, issued Jun. 13, 2017, which is a continuation-in-part of U.S. Non-Provisional application Ser. No. 14/854,622, filed Sep. 15, 2015, titled "System and Method for Delivering Proppant To A Blender," now U.S. Pat. No. 9,670,752, issued Jun. 6, 2017, which claims priority to, and the benefit of U.S. Provisional Application No. 62/217,117, filed Sep. 11, 2015, titled "System and Method for Delivering Proppant To A Blender" and U.S. Provisional Application No. 62/050,752, filed Sep. 15, 2014, titled "System and Method for Delivering Proppant To A Blender," each of which are incorporated herein by reference in their entireties.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system to convey proppant at a fracking site, the system comprising:
   a conveyor auxiliary unit having a proximate end portion and a distal end portion, the proximate end portion movably connected to a conveyor assembly through a pivotable joint, the pivotable joint permitting expansion of the conveyor auxiliary unit away from the conveyor assembly and collapse of the conveyor auxiliary unit toward the conveyor assembly;
   a conveyor belt extending along at least portions of the conveyor assembly and the conveyor auxiliary unit; and
   a proppant chute positioned adjacent the distal end portion of the conveyor auxiliary unit, the proppant chute having an opening to direct the proppant from the conveyor belt into a blending hopper when positioned adjacent the distal end portion of the conveyor auxiliary unit, the proppant chute to be positioned at a higher elevation than an inlet of the blending hopper such that proppant moving into the proppant chute exits the proppant chute into the blending hopper, the pivotable joint also permitting the conveyor auxiliary unit to expand to a higher elevation than the blending hopper while the conveyor assembly is positioned relatively close to a ground plane, thereby enabling gravity feed of proppant from the conveyor belt to the blending hopper.

2. The system as defined in claim 1, comprising a tub positioned upstream of the inlet of the blending hopper to direct the proppant from the proppant chute into the blending hopper, wherein the tub is at a lower elevation than the proppant chute.

3. The system as defined in claim 1, wherein the conveyor auxiliary unit collapses nearly adjacent to the conveyor assembly for compact storage during transportation thereof.

4. The system as defined in claim 1, further comprising a plurality of proppant containers to be arranged in a side-by-side configuration such that one proppant container has a side wall positioned substantially in parallel to a side wall of another proppant container when positioned as a series of proppant containers along a horizontal length of the conveyor assembly, the plurality of proppant containers positioned to allow proppant from the plurality of proppant containers to flow out of each of the plurality of proppant containers and onto the conveyor belt, the proppant containers of the plurality of proppant containers being any modular containers capable of transporting proppant.

5. The system as defined in claim 4, wherein a vertical position of the proppant chute relative to a ground plane is changed as the conveyor auxiliary unit is expanded or collapsed via the pivotable joint.

6. The system as defined in claim 5, further comprising a controller including one or more sensors to measure a weight of the proppant, a speed of the conveyor belt, a rate of discharge from the plurality of containers, or a combination thereof.

7. A system to convey proppant at a fracking site, the system comprising:
   a conveyor auxiliary unit having a proximate end portion and a distal end portion, the proximate end portion movably connected to a conveyor assembly through a pivotable joint, the pivotable joint permitting expansion of the conveyor auxiliary unit away from the conveyor assembly and collapse of the conveyor auxiliary unit toward the conveyor assembly;
   a conveyor belt extending along at least portions of the conveyor assembly and the conveyor auxiliary unit;
   a proppant chute positioned adjacent the distal end portion of the conveyor auxiliary unit, the proppant chute having an opening to direct the proppant from the conveyor belt into a blending hopper when positioned adjacent the distal end portion of the conveyor auxiliary unit, the proppant chute to be positioned at a higher elevation than an inlet of the blending hopper such that proppant moving into the proppant chute exits the proppant chute into the blending hopper, the pivotable joint also permitting the conveyor auxiliary unit to expand to a higher elevation than the blending hopper while the conveyor assembly is positioned relatively close to a ground plane, thereby enabling gravity feed of proppant from the conveyor belt to the blending hopper;
   a plurality of proppant containers arranged in a side-by-side configuration such that one proppant container has a side wall positioned substantially in parallel to a side wall of another proppant container when positioned as a series of proppant containers along a horizontal length of the conveyor assembly, the plurality of proppant containers positioned to allow proppant from the plurality of proppant containers to flow out of each of the plurality of proppant containers and onto the conveyor belt, the proppant containers of the plurality of proppant containers being any modular containers capable of transporting proppant; and
   a controller including one or more sensors to measure a weight of the proppant, a speed of the conveyor belt, a rate of discharge from the plurality of containers, or a combination thereof.

8. The system as defined in claim 7, wherein the conveyor auxiliary unit collapses nearly adjacent to the conveyor assembly for compact storage during transportation thereof.

9. The system as defined in claim 8, comprising a tub positioned upstream of the inlet of the blending hopper to direct the proppant from the proppant chute into the blending hopper, wherein the tub is at a lower elevation than the proppant chute.

10. The system as defined in claim 7, wherein a vertical position of the proppant chute relative to a ground plane is changed as the conveyor auxiliary unit is expanded or collapsed via the pivotable joint.

* * * * *